(12) United States Patent
Mizoe et al.

(10) Patent No.: US 12,516,209 B2
(45) Date of Patent: Jan. 6, 2026

(54) INK SET AND IMAGE RECORDING METHOD

(71) Applicant: FUJIFILM Corporation, Tokyo (JP)

(72) Inventors: Taiga Mizoe, Kanagawa (JP); Masao Ikoshi, Kanagawa (JP); Masaharu Kawai, Kanagawa (JP); Yushi Hongo, Kanagawa (JP); Ryuji Shinohara, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 338 days.

(21) Appl. No.: 18/053,607

(22) Filed: Nov. 8, 2022

(65) Prior Publication Data

US 2023/0086133 A1 Mar. 23, 2023

Related U.S. Application Data

(63) Continuation of application No. PCT/JP2021/015198, filed on Apr. 12, 2021.

(30) Foreign Application Priority Data

May 11, 2020 (JP) ................................. 2020-083140

(51) Int. Cl.
| | | |
|---|---|---|
| C09D 11/40 | (2014.01) | |
| B41M 5/00 | (2006.01) | |
| C09D 11/107 | (2014.01) | |
| C09D 11/30 | (2014.01) | |
| C09D 11/32 | (2014.01) | |
| C09D 11/322 | (2014.01) | |
| C09D 11/326 | (2014.01) | |
| C09D 11/38 | (2014.01) | |
| C09D 11/54 | (2014.01) | |

(52) U.S. Cl.
CPC .............. *C09D 11/40* (2013.01); *B41M 5/00* (2013.01); *B41M 5/0017* (2013.01); *C09D 11/107* (2013.01); *C09D 11/30* (2013.01); *C09D 11/32* (2013.01); *C09D 11/322* (2013.01); *C09D 11/326* (2013.01); *C09D 11/38* (2013.01); *C09D 11/54* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033
See application file for complete search history.

(56) References Cited

U.S. PATENT DOCUMENTS

| | | | |
|---|---|---|---|
| 2001/0020964 A1* | 9/2001 | Irihara | .................... B41J 2/2114 347/43 |
| 2006/0189712 A1 | 8/2006 | Kondo | |
| 2008/0182083 A1* | 7/2008 | Oyanagi | ............... C09D 11/322 524/588 |
| 2009/0306285 A1 | 12/2009 | Li et al. | |
| 2010/0295891 A1* | 11/2010 | Goto | ...................... C09D 11/54 347/21 |
| 2011/0249055 A1 | 10/2011 | Sasada et al. | |

(Continued)

FOREIGN PATENT DOCUMENTS

| | | |
|---|---|---|
| CN | 107250298 A | 10/2017 |
| CN | 110128878 A | 8/2019 |

(Continued)

OTHER PUBLICATIONS

Communication dated Mar. 26, 2024 issued by the Japanese Patent Office in application No. 2022-522568.

(Continued)

*Primary Examiner* — Manish S Shah
(74) *Attorney, Agent, or Firm* — Sughrue Mion, PLLC

(57) ABSTRACT

Provided are an ink set including a colored ink containing a colored pigment which is at least one of a chromatic pigment or a black pigment, a pigment dispersant, and water, and a white ink containing a white pigment, a pigment dispersant, and water, in which the pigment dispersants respectively contained in the colored ink and the white ink contain a polymer having a crosslinked structure or a block polymer, and an image recording method.

19 Claims, No Drawings

(56) References Cited

U.S. PATENT DOCUMENTS

| | | | |
|---|---|---|---|
| 2013/0029045 A1* | 1/2013 | Koganehira | B41J 11/0015 427/256 |
| 2014/0104341 A1* | 4/2014 | Yano | B41J 2/2107 106/31.13 |
| 2014/0287206 A1* | 9/2014 | Sasada | C09D 11/322 428/207 |
| 2015/0054883 A1 | 2/2015 | Okuda et al. | |
| 2016/0032122 A1* | 2/2016 | Toda | C09D 11/322 524/123 |
| 2017/0051170 A1* | 2/2017 | Nakagawa | B41J 2/2107 |
| 2017/0088732 A1* | 3/2017 | Koganehira | C09D 11/102 |
| 2017/0335123 A1* | 11/2017 | Nakamura | C09D 11/38 |
| 2017/0368819 A1* | 12/2017 | Kagata | C09D 11/38 |
| 2018/0187033 A1 | 7/2018 | Sugihara et al. | |
| 2018/0223119 A1 | 8/2018 | Oriakhi et al. | |
| 2018/0244943 A1 | 8/2018 | Okuda et al. | |
| 2018/0282567 A1* | 10/2018 | Ishida | C09D 11/322 |
| 2019/0134989 A1 | 5/2019 | Matsumoto et al. | |
| 2019/0249021 A1 | 8/2019 | Chidate et al. | |
| 2019/0292391 A1 | 9/2019 | Seguchi et al. | |
| 2020/0131391 A1 | 4/2020 | Okuda et al. | |
| 2021/0071021 A1 | 3/2021 | Matsumoto et al. | |
| 2021/0222023 A1 | 7/2021 | Okuda et al. | |
| 2021/0363367 A1 | 11/2021 | Hanazato et al. | |

FOREIGN PATENT DOCUMENTS

| | | |
|---|---|---|
| JP | 2002-347338 A | 12/2002 |
| JP | 2004-339367 A | 12/2004 |
| JP | 2009-190379 A | 8/2009 |
| JP | 2010-046945 A | 3/2010 |
| JP | 2011-231315 A | 11/2011 |
| JP | 2012-041379 A | 3/2012 |
| JP | 2013-082885 A | 5/2013 |
| JP | 2014-015541 A | 1/2014 |
| JP | 2017-109412 A | 6/2017 |
| JP | 2017-206623 A | 11/2017 |
| JP | 2017-226218 A | 12/2017 |
| JP | 2018-108651 A | 7/2018 |
| JP | 2018-109118 A | 7/2018 |
| JP | 2018-178131 A | 11/2018 |
| JP | 2018-203905 A | 12/2018 |
| JP | 2019-099748 A | 6/2019 |
| JP | 2019-116599 A | 7/2019 |
| JP | 2019-119115 A | 7/2019 |
| JP | 2019-163387 A | 9/2019 |
| JP | 2019-167451 A | 10/2019 |
| JP | 2019-181829 A | 10/2019 |
| WO | 2006/087930 A1 | 8/2006 |
| WO | 2007/130561 A2 | 11/2007 |
| WO | 2013/008691 A1 | 1/2013 |
| WO | 2017/009601 A1 | 1/2017 |
| WO | 2019/188995 A1 | 10/2019 |
| WO | 2022/190722 A1 | 9/2022 |

OTHER PUBLICATIONS

Office Communication and Third Party Submission issued Feb. 6, 2024 in Japanese Application No. 2022-522568.

Office Action issued Apr. 23, 2024 in Japanese Application No. 2022-522568.

Japanese Office Action issued Nov. 28, 2023 in Application No. 2022-522568.

International Search Report dated Jul. 13, 2021 from the International Searching Authority in International Application No. PCT/JP2021/015198.

Written Opinion dated Jul. 13, 2021 from the International Searching Authority in International Application No. PCT/JP2021/015198.

International Preliminary Report on Patentability with the translation of Written Opinion dated Nov. 15, 2022 from the International Bureau in International Application No. PCT/JP2021/015198.

Notification of Reasons for Refusal dated Mar. 21, 2023 from the Chinese Patent Office in Application No. 202180033916.5.

Yan Ruixuan, "Application of Water Soluble Highmolecular Polymers in Coatings", China Academic Journal Electronic Publishing House, 1999, vol. 4, pp. 31-36 (6 total pages).

Pan Yong, "Selection of Wetting and Dispersing Additives for Dispersion of Organic and Carbon Black Pigments", Painting & Coatings Industry, Aug. 2018, vol. 48, No. 8, pp. 25-30 (6 total pages).

Extended European Search Report dated Oct. 9, 2023, issued in European Application No. 21803710.9.

Notification of Submission of Publications issued May 9, 2023 in Japanese Application No. 2022-522568.

"DISPERBYK-190" BYK Additives & Instruments, Data Sheet, Issued Oct. 2012 (4 pages total).

"DenacolEX-321L", DENACOL Nagase ChemteX Epoxy compound (1 page total).

"Functional Materials ε-Caprolactone and Derivatives Cycloaliphatic Epoxides / Other Epoxides", Diacel Corporation, Revised Mar. 2018 (4 pages total).

\* cited by examiner

INK SET AND IMAGE RECORDING METHOD

CROSS-REFERENCE TO RELATED APPLICATION

This application is a Continuation of International Application No. PCT/JP2021/015198, filed Apr. 12, 2021, which claims priority to Japanese Patent Application No. 2020-083140 filed May 11, 2020. Each of the above applications is hereby expressly incorporated by reference, in its entirety, into the present application.

BACKGROUND OF THE INVENTION

1. Field of the Invention

The present disclosure relates to an ink set and an image recording method.

2. Description of the Related Art

In the related art, various examinations have been conducted on image recording carried out using a pretreatment liquid and a plurality of inks.

For example, JP2019-167451A describes an ink set including a first ink and a second ink as an aqueous ink composition, in which the first ink and the second ink contain a pigment and resin particles, the first ink contains a first pigment, the second ink contains a second pigment different from the first pigment, the first ink and the second ink are mixed with a 5 mass % aqueous solution of a magnesium sulfate heptahydrate so that the volume average particle diameter of the ink is increased, a difference in the volume average particle diameter between the ink after the mixing is 40% or less, and the ink set is used for recording together with a treatment liquid containing an aggregating agent that aggregates components of the aqueous ink composition. Further, JP2018-178131A describes an ink set including a reaction solution containing an aggregating agent, a first ink containing a coloring material, and a second ink containing a coloring material, in which the ink set is used for recording an image on a non-absorptive recording medium or a low-absorptive recording medium, and the ink set is used by applying the reaction solution, the first ink, and the second ink to the recording medium such that the reaction solution, the first ink, and the second ink are superimposed thereon in this order.

SUMMARY OF THE INVENTION

In a case where an image is recorded using a colored ink and a white ink after application of a pretreatment liquid onto a base material, the pretreatment liquid is applied onto the base material, it may be required to suppress breakage of an image to be recorded.

The present disclosure has been made in view of such circumstances, and an object of an embodiment of the present invention is to provide an ink set and an image recording method that enable recording of an image in which breakage is suppressed in a case where an image is recorded using a colored ink and a white ink after application of a pretreatment liquid.

The present disclosure includes the following aspects.

<1> An ink set comprising: a colored ink containing a colored pigment which is at least one of a chromatic pigment or a black pigment, a pigment dispersant, and water; and a white ink containing a white pigment, a pigment dispersant, and water, in which the pigment dispersants respectively contained in the colored ink and the white ink contain a polymer having a crosslinked structure or a block polymer.

<2> The ink set according to <1>, in which the pigment dispersant contained in the colored ink contains a polymer having a crosslinked structure.

<3> The ink set according to <1> or <2>, in which the pigment dispersant contained in the white ink contains a block polymer.

<4> The ink set according to any one of <1> to <3>, in which an acid value of the pigment dispersant contained in the colored ink is in a range of 30 mgKOH/g to 180 mgKOH/g.

<5> The ink set according to any one of <1> to <4>, in which an acid value of the pigment dispersant contained in the white ink is in a range of 60 mgKOH/g to 150 mgKOH/g.

<6> The ink set according to any one of <1> to <5>, in which the pigment dispersants respectively contained in the colored ink and the white ink have a structural unit derived from an ethylenically unsaturated compound having an aromatic ring structure or an alicyclic structure.

<7> The ink set according to any one of <1> to <6>, in which an absolute value of a difference between a surface tension of the colored ink and a surface tension of the white ink is in a range of 0.05 mN/m to 10.0 mN/m.

<8> The ink set according to any one of <1> to <7>, further comprising: a pretreatment liquid containing an aggregating agent.

<9> The ink set according to <8>, in which an absolute value of a difference between a surface tension of the pretreatment liquid and a surface tension of the colored ink is in a range of 0.05 mN/m to 10.0 mN/m.

<10> An image recording method comprising: using the ink set according to any one of <1> to <7>, a colored ink applying step of applying the colored ink onto an impermeable base material; and a white ink applying step of applying the white ink onto a colored ink film formed by the application of the colored ink.

<11> An image recording method comprising: using the ink set according to <8> or <9>, a pretreatment liquid applying step of applying the pretreatment liquid onto an impermeable base material; and an ink applying step of applying the colored ink and the white ink onto the impermeable base material onto which the pretreatment liquid has been applied, using an ink jet recording method.

According to the present disclosure, it is possible to provide an ink set and an image recording method that enable recording of an image in which breakage is suppressed in a case where an image is recorded using a colored ink and a white ink after application of a pretreatment liquid.

DESCRIPTION OF THE PREFERRED EMBODIMENTS

Hereinafter, an ink set and an image recording method of the present disclosure will be described in detail.

In the present specification, a numerical range shown using "to" indicates a range including the numerical values described before and after "to" as a minimum value and a maximum value, respectively.

In a numerical range described in a stepwise manner in the present disclosure, an upper limit or a lower limit described in a certain numerical range may be replaced with an upper limit or a lower limit in another numerical range described in a stepwise manner. Further, in a numerical range described in the present disclosure, an upper limit or a lower limit described in a certain numerical range may be replaced with a value described in an example.

In the present disclosure, in a case where a plurality of substances corresponding to respective components in a composition are present, the amount of the respective components in the composition indicates the total amount of the plurality of substances present in the composition unless otherwise specified.

In the present invention, a combination of two or more preferred embodiments is a more preferred embodiment.

In the present disclosure, the meaning of the term "step" includes not only an independent step but also a step whose intended purpose is achieved even in a case where the step is not clearly distinguished from other steps.

In the present specification, the term "image" denotes an entire film formed by applying a pretreatment liquid and an ink in this order, and the term "image recording" denotes formation of an image (that is, the film).

Further, the concept of "image" in the present specification also includes a solid image.

In the present specification, the concept of "(meth)acrylate" includes both acrylate and methacrylate. In addition, the concept "(meth)acryl" includes both acryl and methacryl.

[Ink Set]

An ink set of the present disclosure includes a colored ink comprising a colored pigment which is at least one of a chromatic pigment or a black pigment, a pigment dispersant, and water, and a white ink comprising a white pigment, a pigment dispersant, and water, in which each of the pigment dispersants in the colored ink and the pigment dispersants in the white ink comprise a polymer having a crosslinked structure or a block polymer.

In the related art, a method of recording an image using a plurality of inks after application of a pretreatment liquid onto a base material has been known. The pretreatment liquid contains an aggregating agent, and thus in a case where an ink is applied onto a base material onto which the pretreatment liquid has been applied, the components (particularly, a pigment dispersant) contained in the ink are aggregated by the aggregating agent. It is considered that the reason why an image to be recorded is broken is that the aggregation occurs non-uniformly.

JP2019-167451A describes an ink set including a first ink and a second ink as an aqueous ink composition, in which the ink set is used for recording together with a treatment liquid containing an aggregating agent that aggregates the components of the aqueous ink composition. JP2019-167451A describes that a resin dispersant which disperses the pigment contained in the first ink and the second ink can be used in any form of a random copolymer, a block copolymer, an alternating copolymer, or a graft copolymer as a form of a copolymer. That is, JP2019-167451A does not pay attention to the structure of the resin dispersant that disperses the pigment.

JP2018-178131A describes an ink set including a reaction solution containing an aggregating agent, a first ink containing a coloring material, and a second ink containing a coloring material. JP2018-178131A does not pay attention to the structure of the pigment dispersant that disperses the coloring material.

Meanwhile, in the ink set of the present disclosure, the pigment dispersants respectively contained in the colored ink and the white ink contain a polymer having a crosslinked structure or a blocking polymer. The reason why breakage of an image to be recorded is suppressed in a case of using the ink set of the present disclosure is assumed as follows. It is considered that the polymer having a crosslinked structure and the block polymer have satisfactory adsorptivity to the colored pigment and the white pigment so that the amount of the free polymer in the colored ink and the white ink is small. Therefore, it is considered that breakage of an image to be recorded is suppressed because aggregation by the aggregating agent contained in the pretreatment liquid proceeds relatively uniformly.

Hereinafter, each component contained in the colored ink and the white ink constituting the ink set of the present disclosure will be described.

<Colored Ink>

In the present disclosure, the colored ink contains a colored pigment which is at least one of a chromatic pigment or a black pigment, a pigment dispersant, and water.

(Colored Pigment)

The colored ink contains a colored pigment which is at least one of a chromatic pigment or a black pigment. The colored ink may contain only one or two or more kinds of colored pigments. That is, the colored pigment contained in the colored ink may be one or more kinds of chromatic pigments, one or more kinds of black pigments, or a combination of one or more kinds of chromatic pigments and one or more kinds of black pigments.

The chromatic pigment may be a pigment exhibiting a chromatic color, and the kind thereof is not particularly limited.

The chromatic pigment is not particularly limited, and examples thereof include a cyan pigment, a magenta pigment, a yellow pigment, a blue pigment, a red pigment, a green pigment, an orange pigment, and a violet pigment.

Specific examples of the chromatic pigment include organic pigments such as an azo pigment, a disazo pigment, a condensed disazo pigment, a phthalocyanine pigment, a quinacridone pigment, a quinacridone quinone pigment, an anthraquinone pigment, an aminoanthraquinone pigment, an anthanthrone pigment, a dioxazine pigment, an indigo pigment, a thioindigo pigment, a perinone pigment, a perylene pigment, an isoindoline pigment, an isoindolinone pigment, an isoviolanthrone pigment, a benzimidazolone pigment, an indanthrone pigment, a triarylcarbonium pigment, and a diketopyrrolopyrrole pigment.

More specific examples of the chromatic pigment include a perylene pigment such as C.I. Pigment Red 190, C.I. Pigment Red 224, or C.I. Pigment Violet 29; a perinone pigment such as C.I. Pigment Orange 43 or C.I. Pigment Red 194; a quinacridone pigment such as C.I. Pigment Violet 19, C.I. Pigment Violet 42, C.I. Pigment Red 122, C.I. Pigment Red 192, C.I. Pigment Red 202, C.I. Pigment Red 207, or C.I. Pigment Red 209; a quinacridone quinone pigment such as C.I. Pigment Red 206, C.I. Pigment Orange 48, or C.I. Pigment Orange 49; an anthraquinone pigment such as C.I. Pigment Yellow 147; an anthanthrone pigment such as C.I. Pigment Red 168; a benzimidazolone pigment such as C.I. Pigment Brown 25, C.I. Pigment Violet 32, C.I. Pigment Orange 36, C.I. Pigment Yellow 120, C.I. Pigment Yellow 180, C.I. Pigment Yellow 181, C.I. Pigment Orange 62, or C.I. Pigment Red 185; a condensed disazo pigment such as C.I. Pigment Yellow 93, C.I. Pigment Yellow 94, C.I. Pigment Yellow 95, C.I. Pigment Yellow 128, C.I. Pigment Yellow 166, C.I. Pigment Orange 34, C.I. Pigment Orange 13, C.I. Pigment Orange 31, C.I. Pigment Red 144, C.I. Pigment Red 166, C.I. Pigment Red 220, C.I. Pigment Red 221, C.I. Pigment Red 242, Pigment Red 248, C.I. Pigment Red 262, or C.I. Pigment Brown 23; a disazo pigment such as C.I. Pigment Yellow 13, C.I. Pigment Yellow 83, or C.I. Pigment Yellow 188; an azo pigment such as C.I. Pigment Red 187, C.I. Pigment Red 170, C.I. Pigment Yellow 74, C.I. Pigment Yellow 150, C.I. Pigment Red 48, C.I. Pigment Red 53, C.I. Pigment Orange 64, or C.I. Pigment Red 247; an indanthrone pigment such as C.I. Pigment Blue 60; a phthalocyanine pigment such as C.I. Pigment Green 7, C.I. Pigment Green 36, C.I. Pigment Green 37, C.I. Pigment Green 58, C.I. Pigment Blue 16, C.I. Pigment Blue 75, or C.I. Pigment Blue 15; a triarylcarbonium pigment such as C.I. Pigment Blue 56 or C.I. Pigment Blue 61; a dioxazine pigment such as C.I. Pigment Violet 23 or C.I. Pigment Violet 37; an aminoanthraquinone pigment such as C.I. Pigment Red 177; a diketopyrrolopyrrole pigment such as C.I. Pigment Red 254, C.I. Pigment Red 255, C.I. Pigment Red 264, C.I. Pigment Red 272, C.I. Pigment Orange 71, or C.I. Pigment Orange 73; a thioindigo pigment such as C.I. Pigment Red 88; an isoindoline pigment such as C.I. Pigment Yellow 139 or C.I. Pigment Orange 66; an isoindolinone pigment such as C.I. Pigment Yellow 109 or C.I. Pigment Orange 61; a pyranthrone pigment such as C.I. Pigment Orange 40 or C.I. Pigment Red 216; and an isoviolanthrone pigment such as C.I. Pigment Violet 31.

The black pigment may be a pigment exhibiting a black color, and the kind thereof is not particularly limited. Examples of the black pigment include carbon black and titanium black.

The average particle diameter of the chromatic pigment and the black pigment is preferably in a range of 10 nm to 200 nm, more preferably in a range of 10 nm to 150 nm, and still more preferably in a range of 10 nm to 110 nm. The color reproducibility is enhanced in a case where the average particle diameter is 200 nm or less, and the jetting stability is enhanced in a case where an image is recorded using an ink jet recording method. Further, the light resistance is enhanced in a case where the average particle diameter is 10 nm or greater. In addition, the particle size distribution of the pigment may be any of a wide particle size distribution or a monodispersed particle size distribution. Further, the average particle diameter and the particle size distribution of the pigment are acquired by measuring the volume average particle diameter using a particle size distribution measuring device, for example, "NANOTRAC UPA-EX150" (product name, manufactured by Nikkiso Co., Ltd.) according to a dynamic light scattering method. Further, in a case where the pigment is coated with the pigment dispersant, the average particle diameter of the pigment denotes the average particle diameter of the pigment coated with the pigment dispersant.

From the viewpoints of the image density and the jetting stability, the content of the colored pigment is preferably in a range of 1% by mass to 15% by mass and more preferably in a range of 2% by mass to 10% by mass with respect to the total mass of the colored ink.

(Pigment Dispersant)

The colored ink of the present disclosure contains a pigment dispersant. The pigment dispersant contains a polymer having a crosslinked structure or a block polymer. In the present disclosure, the polymer denotes a compound having a weight-average molecular weight of 1000 or greater.

In the present disclosure, the weight-average molecular weight (Mw) denotes a value measured by gel permeation chromatography (GPC). The measurement according to gel permeation chromatography (GPC) is performed using HLC (registered trademark)-8020GPC (manufactured by Tosoh Corporation) as a measuring device, three columns of TSK-gel (registered trademark) Super Multipore HZ-H (manufactured by Tosoh Corporation, 4.6 mmID×15 cm), and tetrahydrofuran (THF) as an eluent. Further, the measurement is performed under measurement conditions of a sample concentration of 0.45% by mass, a flow rate of 0.35 ml/min, a sample injection volume of 10 µl, and a measurement temperature of 40° C. using an RI detector. Further, the calibration curve is prepared using eight samples of "F-40", "F-20", "F-4", "F-1", "A-5000", "A-2500", "A-1000", and "n-propylbenzene" which are "Standard Samples TSK standard, polystyrene" (manufactured by Tosoh Corporation).

In the present disclosure, the pigment dispersant has a function of dispersing the pigment. The pigment dispersant is adsorbed on the surface of the pigment and applied to at least a part of the surface of the pigment, and thus the pigment can be dispersed in water.

The acid value of the pigment dispersant contained in the colored ink is preferably in a range of 20 mgKOH/g to 205 mgKOH/g, more preferably in a range of 30 mgKOH/g to 180 mgKOH/g, and still more preferably in a range of 65 mgKOH/g to 140 mgKOH/g. In a case where the acid value of the pigment dispersant is 20 mgKOH/g or greater, the image quality of an image to be recorded is more excellent. Further, in a case where the acid value of the pigment dispersant is 205 mgKOH/g or less, breakage of an image to be recorded is further suppressed. In the present disclosure, the acid value is a value measured by the method described in JIS K0070: 1992.

—Polymer Having Crosslinked Structure—

The polymer having a crosslinked structure is not particularly limited as long as the polymer is a polymer having at least one crosslinked structure in a molecule.

Whether or not the polymer contained in the ink has a crosslinked structure can be determined, for example, by the following method. First, the polymer is separated from the ink by a separation method such as solvent extraction. The presence or absence of the crosslinked structure can be comprehensively determined by analyzing the separated polymer using various analysis methods such as a nuclear magnetic resonance method (NMR), an infrared spectroscopy method (IR), and a thermal analysis method.

The polymer having a crosslinked structure (hereinafter, also referred to as "crosslinked polymer") is formed by, for example, crosslinking an uncrosslinked polymer with a crosslinking agent. It is preferable that the uncrosslinked polymer is a water-soluble polymer.

In the present disclosure, the term "water-soluble" in "water-soluble polymer" denotes a property that the amount of a polymer to be dissolved in 100 g of distilled water at 25° C. is 2 g or greater. The amount of the water-soluble polymer dissolved in distilled water at 25° C. is preferably 5 g or greater and more preferably 10 g or greater.

Examples of the uncrosslinked polymer include polyvinyl, polyurethane, and polyester. Among these, polyvinyl is preferable as the uncrosslinked polymer.

It is preferable that the uncrosslinked polymer is a polymer containing a functional group that can be crosslinked by a crosslinking agent. Examples of the crosslinkable functional group include a carboxy group or a salt thereof, an isocyanate group, and an epoxy group. Among these, from the viewpoint of improving the dispersibility of the pigment, a carboxy group or a salt thereof is preferable, and a carboxy group is particularly preferable as the crosslinkable functional group. That is, a polymer containing a carboxy group is preferable as the uncrosslinked polymer.

It is preferable that the uncrosslinked polymer is a copolymer having a structural unit derived from a monomer containing a carboxy group (hereinafter, referred to as "carboxy group-containing monomer"). The structural unit derived from a carboxy group-containing monomer contained in a copolymer may be used alone or two or more kinds thereof. The copolymer may be a random copolymer or a block copolymer, but is preferably a random copolymer.

Examples of the carboxy group-containing monomer include (meth)acrylic acid, β-carboxyethyl acrylate, fumaric acid, itaconic acid, maleic acid, and crotonic acid.

From the viewpoints of the crosslinking properties and the dispersibility, (meth)acrylic acid or β-carboxyethyl acrylate is preferable, and (meth)acrylic acid is more preferable as the carboxy group-containing monomer.

It is preferable that the uncrosslinked polymer has a structural unit derived from a hydrophobic monomer in addition to the structural unit derived from a carboxy group-containing monomer. The structural unit derived from a hydrophobic monomer contained in the copolymer may be used alone or two or more kinds thereof.

From the viewpoint of the adsorptivity to the chromatic pigment and the black pigment, it is preferable that the hydrophobic monomer contains an ethylenically unsaturated compound having an aromatic ring structure or an alicyclic structure. That is, it is preferable that the crosslinked polymer has a structural unit derived from an ethylenically unsaturated compound having an aromatic ring structure or an alicyclic structure.

It is preferable that the structural unit derived from the ethylenically unsaturated compound having an aromatic ring structure or an alicyclic structure is at least one selected from the group consisting of structural units represented by Formulae (A) to (F).

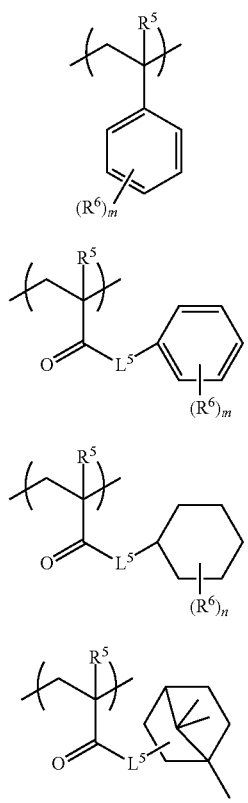

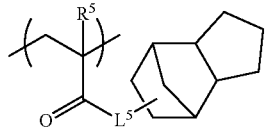

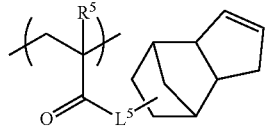

In Formulae (A) to (F), $R^5$'s each independently represent a hydrogen atom or a methyl group. $R^6$'s each independently represent an alkyl group, an alkenyl group, or an alkynyl group. m represents an integer of 0 to 5. n represents an integer of 0 to 11. $L^5$ represents a divalent group which is one selected from the first group consisting of an alkylene group having 1 to 18 carbon atoms, an arylene group having 6 to 18 carbon atoms, —O—, —NH—, —S—, and —C(=O)—, a divalent group which is obtained by combining two or more selected from the first group, or a single bond.

[$R^6$]

In Formulae (A) to (F), $R^6$'s each independently represent an alkyl group, an alkenyl group, or an alkynyl group.

As the alkyl group, an alkyl group having 1 to 10 carbon atoms is preferable, an alkyl group having 1 to 4 carbon atoms is more preferable, and a methyl group or an ethyl group is still more preferable.

As the alkenyl group, an alkenyl group having 2 to 10 carbon atoms is preferable, an alkenyl group having 2 to 4 carbon atoms is more preferable, and an alkenyl group having 2 or 3 carbon atoms is still more preferable.

As the alkynyl group, an alkynyl group having 2 to 10 carbon atoms is preferable, an alkynyl group having 2 to 4 carbon atoms is more preferable, and an alkynyl group having 2 or 3 carbon atoms is still more preferable.

Further, $R^6$ may represent an unsubstituted group or a group substituted with a substituent. In a case where $R^6$ is substituted with a substituent, examples of the substituent include a halogen atom (such as a chlorine atom or a bromine atom) and an alkyl group (such as a methyl group or an ethyl group).

[m]

m in Formula (A) and Formula (B) denotes the number of substituents ($R^6$) for the benzene ring.

Further, m represents an integer of 0 to 5, preferably an integer of 0 to 3, more preferably an integer of 0 to 2, and still more preferably 0 or 1.

[n]

n in Formula (C) denotes the number of substituents ($R^6$) for the cyclohexane ring.

Further, n represents an integer of 0 to 11, preferably an integer of 0 to 6, more preferably an integer of 0 to 2, and still more preferably 0 or 1.

[$L^5$]

In Formulae (A) to (F), $L^5$ represents a divalent group which is one selected from the fourth group consisting of an alkylene group having 1 to 18 carbon atoms, an arylene group having 6 to 18 carbon atoms, —O—, —NH—, —S—, and —C(=O)—, a divalent group which is obtained by combining two or more selected from the fourth group, or a single bond.

The alkylene group having 1 to 18 carbon atoms as $L^5$ may be linear or may have a branched structure and/or a cyclic structure.

The number of carbon atoms of the alkylene group having 1 to 18 carbon atoms as $L^5$ is preferably in a range of 1 to 12, more preferably in a range of 1 to 6, and still more preferably 1 or 2.

Examples of the arylene group having 6 to 18 carbon atoms include a phenylene group, a naphthylene group, and a tolyl group.

The number of carbon atoms of the arylene group having 6 to 18 carbon atoms as $L^5$ is preferably in a range of 6 to 12 and more preferably in a range of 6 to 10.

As "divalent group obtained by combining two or more selected from the first group" as $L^5$, a divalent group formed by combining at least one of an alkylene group having 1 to 18 carbon atoms or an arylene group having 6 to 18 carbon atoms with at least one of —O—, —NH—, —S—, or —C(=O)— is preferable, and the following group (AO5) or the following group (AO6) is particularly preferable.

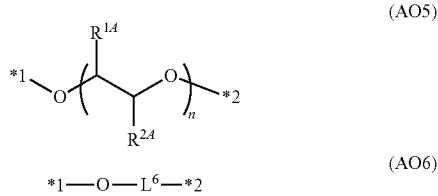

(AO5)

(AO6)

In the group (AO5), $R^{1A}$ and $R^{2A}$ each independently represent a hydrogen atom or a methyl group, n represents an integer of 1 to 8 (preferably an integer of 1 to 4 and more preferably 1 or 2), *1 represents a bonding position with respect to a carbonyl carbon atom, and *2 represents a bonding position with respect to a non-carbonyl carbon atom.

It is preferable that in a case where one of $R^{1A}$ and $R^{2A}$ represents a methyl group, the other represents a hydrogen atom.

In the group (AO6), $L^6$ represents an alkylene group having 1 to 8 carbon atoms (preferably 1 to 4 carbon atoms and more preferably 1 or 2 carbon atoms), *1 represents a bonding position with respect to a carbonyl carbon atom, and *2 represents the bonding position with respect to a non-carbonyl carbon atom.

$L^5$ represents preferably a single bond, —O—, the group (AO5), or the group (AO6), more preferably a single bond or —O—, and still more preferably —O—.

Hereinafter, specific examples of the structural unit represented by Formula (A) will be shown, but the structural unit represented by Formula (A) is not limited to the following specific examples.

Hereinafter, specific examples of the structural unit represented by Formula (B) will be shown, but the structural unit represented by Formula (B) is not limited to the following specific examples.

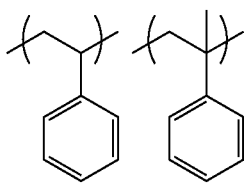

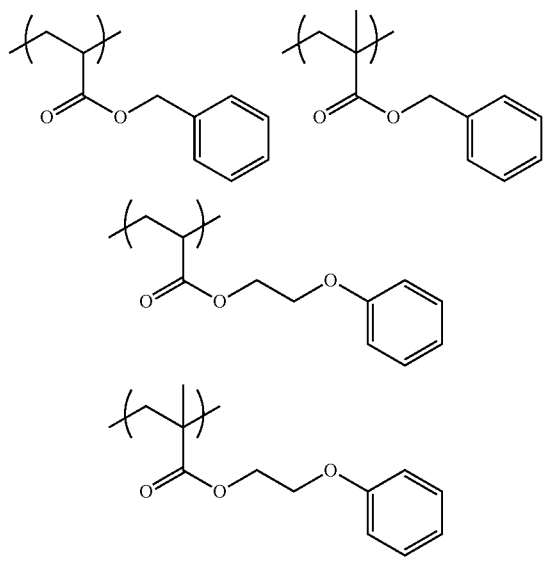

Hereinafter, specific examples of the structural unit represented by Formula (C) will be shown, but the structural unit represented by Formula (C) is not limited to the following specific examples.

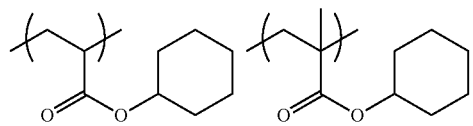

Hereinafter, specific examples of the structural unit represented by Formula (D) will be shown, but the structural unit represented by Formula (D) is not limited to the following specific examples.

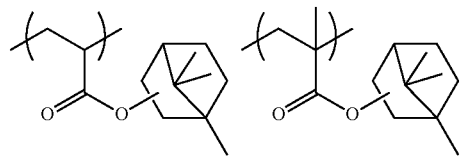

Hereinafter, specific examples of the structural unit represented by Formula (E) will be shown, but the structural unit represented by Formula (E) is not limited to the following specific examples.

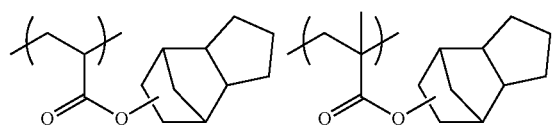

Hereinafter, specific examples of the structural unit represented by Formula (F) will be shown, but the structural unit represented by Formula (F) is not limited to the following specific examples.

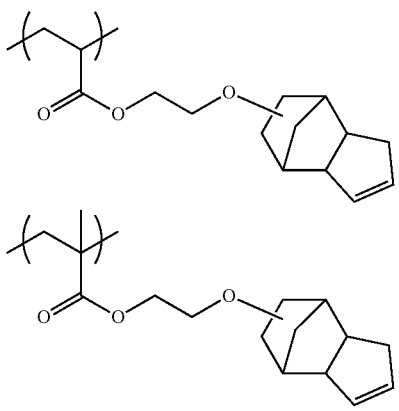

The content of the structural unit derived from the ethylenically unsaturated compound having an aromatic ring structure or an alicyclic structure in the uncrosslinked polymer is preferably in a range of 35% by mass to 95% by mass, more preferably in a range of 50% by mass to 95% by mass, and still more preferably in a range of 70% by mass to 90% by mass with respect to the total amount of the uncrosslinked polymer.

Similarly, the content of the structural unit derived from the ethylenically unsaturated compound having an aromatic ring structure or an alicyclic structure in the crosslinked polymer is preferably in a range of 35% by mass to 95% by mass, more preferably in a range of 50% by mass to 95% by mass, and still more preferably in a range of 70% by mass to 90% by mass with respect to the total amount of the crosslinked polymer (pigment dispersant).

In addition, examples of the structural unit derived from the hydrophobic monomer include a (meth)acrylate containing an alkyl group having 1 to 20 carbon atoms. The alkyl group may be any of linear or branched. Examples of the (meth)acrylate containing an alkyl group having 1 to 20 carbon atoms include methyl (meth)acrylate, ethyl (meth)acrylate, n-propyl (meth)acrylate, n-butyl (meth)acrylate, 2-ethylhexyl (meth)acrylate, and octyl (meth)acrylate.

As the uncrosslinked polymer, a random copolymer having a structural unit derived from a carboxy group-containing monomer and a structural unit derived from an ethylenically unsaturated compound having an aromatic ring structure or an alicyclic structure is preferable, a random copolymer having a structural unit derived from (meth)acrylic acid and a structural unit derived from a (meth)acrylate having an aromatic ring structure or an alicyclic structure is more preferable, and a random copolymer having a structural unit derived from (meth)acrylic acid and a structural unit derived from benzyl (meth)acrylate is particularly preferable.

From the viewpoint of the dispersibility of the pigment, the acid value of the uncrosslinked polymer is preferably in a range of 65 mgKOH/g to 220 mgKOH/g and more preferably in a range of 65 mgKOH/g to 170 mgKOH/g.

Further, from the viewpoint of suppressing breakage of an image to be recorded and improving the image quality of the image to be recorded, the acid value of the crosslinked polymer is preferably in a range of 20 mgKOH/g to 205 mgKOH/g, more preferably in a range of 30 mgKOH/g to 180 mgKOH/g, and still more preferably in a range of 65 mgKOH/g to 140 mgKOH/g. In a case where the acid value of the crosslinked polymer is 20 mgKOH/g or greater, the image quality of an image to be recorded is more excellent.

Further, in a case where the acid value of the crosslinked polymer is 205 mgKOH/g or less, breakage of an image to be recorded is further suppressed.

The weight-average molecular weight (Mw) of the uncrosslinked polymer is not particularly limited, but is preferably in a range of 3000 to 300000, more preferably in a range of 5000 to 200000, and still more preferably in a range of 7000 to 100000 from the viewpoint of the dispersibility of the pigment.

The preferable ranges of the weight-average molecular weight of the crosslinked polymer are the same as the preferable ranges of the weight-average molecular weight of the uncrosslinked polymer.

It is preferable that the crosslinking agent used in a case of crosslinking the uncrosslinked polymer is a compound having two or more reaction sites with the uncrosslinked polymer (for example, a polymer containing a carboxy group). The crosslinking agent may be used alone or in combination of two or more kinds thereof.

As a combination of the crosslinking agent and the uncrosslinked polymer, a combination of a compound containing two or more epoxy groups (that is, a bifunctional or higher functional epoxy compound) and a polymer containing a carboxy group is preferable. In this combination, a crosslinked structure is formed by the reaction between the epoxy group and the carboxy group. It is preferable that the crosslinked structure is formed by the crosslinking agent after the pigment is dispersed by the uncrosslinked polymer.

Examples of the bifunctional or higher functional epoxy compound include ethylene glycol diglycidyl ether, polyethylene glycol diglycidyl ether, 1,6-hexanediol diglycidyl ether, diethylene glycol diglycidyl ether, polyethylene glycol diglycidyl ether, dipropylene glycol diglycidyl ether, polypropylene glycol diglycidyl ether, and trimethylolpropane triglycidyl ether.

Among these, polyethylene glycol diglycidyl ether, diethylene glycol diglycidyl ether, or trimethylolpropane triglycidyl ether is preferable as the bifunctional or higher functional epoxy compound.

Commercially available products may be used as the crosslinking agent.

Examples of the commercially available products include Denacol EX-321, EX-821, EX-830, EX-850, and EX-851 (manufactured by Nagase ChemteX Corporation).

From the viewpoints of the crosslinking reaction rate and the dispersion stability after crosslinking, the molar ratio between a reaction site (for example, an epoxy group) in the crosslinking agent and a reaction site (for example, a carboxy group) in the uncrosslinked polymer is preferably in a range of 1:1.1 to 1:10, more preferably in a range of 1:1.1 to 1:5, and still more preferably in a range of 1:1.1 to 1:3.

—Block Polymer—

The block polymer is also referred to as a block copolymer, and is a copolymer in which at least two polymers are bonded to each other in a molecule.

It is preferable that the block polymer has a structural unit derived from a hydrophobic monomer and a structural unit derived from a monomer containing an anionic group (hereinafter, referred to as "anionic group-containing monomer").

The structural unit derived from a hydrophobic monomer contained in the block polymer may be used alone or two or more kinds thereof. The structural unit derived from an anionic group-containing monomer contained in the block polymer may be used alone or two or more kinds thereof.

Examples of the structural unit derived from a hydrophobic monomer include an ethylenically unsaturated compound having an aromatic ring structure or an alicyclic structure and a (meth)acrylate containing an alkyl group having 1 to 20 carbon atoms.

The content of the structural unit derived from a hydrophobic monomer is preferably in a range of 35% by mass to 95% by mass, more preferably in a range of 50% by mass to 95% by mass, and still more preferably in a range of 70% by mass to 90% by mass with respect to the total amount of the block polymer.

From the viewpoint of the adsorptivity to the pigment, the hydrophobic monomer contains preferably an ethylenically unsaturated compound having an aromatic ring structure or an alicyclic structure, more preferably an ethylenically unsaturated compound having an alicyclic structure, and still more preferably an ethylenically unsaturated compound having an alicyclic structure having 6 or more carbon atoms.

It is preferable that the structural unit derived from the ethylenically unsaturated compound having an aromatic ring structure or an alicyclic structure is at least one selected from the group consisting of structural units represented by Formulae (A) to (F) described in the section of the crosslinked polymer.

The content of the structural unit derived from the ethylenically unsaturated compound having an aromatic ring structure or an alicyclic structure is preferably in a range of 10% by mass to 90% by mass, more preferably in a range of 20% by mass to 80% by mass, still more preferably in a range of 30% by mass to 70% by mass, and even still more preferably in a range of 30% by mass to 60% by mass with respect to the total amount of the block polymer.

It is also preferable that the structural unit derived from the hydrophobic monomer contains a (meth)acrylate containing an alkyl group having 1 to 20 carbon atoms. The alkyl group may be any of linear or branched.

Examples of the (meth)acrylate containing an alkyl group having 1 to 20 carbon atoms include methyl (meth)acrylate, ethyl (meth)acrylate, n-propyl (meth)acrylate, n-butyl (meth)acrylate, 2-ethylhexyl (meth)acrylate, and octyl (meth)acrylate.

The content of the structural unit derived from a (meth) acrylate containing an alkyl group having 1 to 20 carbon atoms is preferably in a range of 10% by mass to 90% by mass, more preferably in a range of 20% by mass to 80% by mass, still more preferably in a range of 30% by mass to 70% by mass, and particularly preferably in a range of 40% by mass to 60% by mass with respect to the total amount of the block polymer.

Examples of the anionic group in the structural unit derived from an anionic group-containing monomer include a carboxy group, a salt of the carboxy group, a sulfo group, a salt of the sulfo group, a phosphoric acid group, a salt of the phosphoric acid group, a phosphonic acid group, and a salt of the phosphonic acid group.

Examples of the counterion in a salt include an alkali metal ion such as a sodium ion, a potassium ion, or a lithium ion, an alkaline earth metal ion such as a calcium ion or a magnesium ion, and an ammonium ion.

Among these, a carboxy group or a salt of the carboxy group is preferable as the anionic group. Examples of the anionic group-containing monomer include (meth)acrylic acid, β-carboxyethyl acrylate, fumaric acid, itaconic acid, maleic acid, and crotonic acid. Among these, (meth)acrylic acid is preferable as the anionic group-containing monomer.

The content of the structural unit derived from the anionic group-containing monomer is preferably in a range of 1% by mass to 30% by mass, more preferably in a range of 2% by mass to 25% by mass, and still more preferably in a range of 3% by mass to 20% by mass with respect to the total amount of the block polymer.

Whether or not the polymer contained in the ink is a block polymer can be determined by, for example, the following method. First, the polymer is separated from the ink by a separation method such as solvent extraction. The physical properties such as the glass transition temperature are measured by performing analysis on the separated polymer using various analysis methods such as a nuclear magnetic resonance method (NMR), an infrared spectroscopy method (IR), and a thermal analysis method, and thus it is possible to comprehensively determine whether the polymer is a block polymer.

Further, from the viewpoint of suppressing breakage of an image to be recorded and improving the image quality of the image to be recorded, the acid value of the block polymer is preferably in a range of 30 mgKOH/g to 170 mgKOH/g, more preferably in a range of 60 mgKOH/g to 150 mgKOH/g, and still more preferably in a range of 80 mgKOH/g to 120 mgKOH/g. In a case where the acid value of the block polymer is 30 mgKOH/g or greater, the image quality of the image to be recorded is more excellent. Further, in a case where the acid value of the block polymer is 170 mgKOH/g or less, breakage of the image to be recorded is further suppressed.

The weight-average molecular weight (Mw) of the block polymer is not particularly limited, but is preferably in a range of 3000 to 100000, more preferably in a range of 5000 to 80000, and still more preferably in a range of 10000 to 60000 from the viewpoint of the dispersibility of the pigment.

The pigment dispersant is considered to be present in the ink in a state where a part of the pigment dispersant is adsorbed on the surface of the pigment and a part thereof is desorbed from the surface of the pigment. In the present disclosure, it is preferable that the pigment dispersant contained in the colored ink is a crosslinked polymer. It is considered that the pigment dispersant is unlikely to be desorbed from the surface of the colored pigment in a case where the pigment dispersant is a polymer having a crosslinked structure. As a result, it is considered that in a case where the colored ink is applied onto the base material onto which the pretreatment liquid has been applied, aggregation by the aggregating agent contained in the pretreatment liquid is more uniformly carried out, and thus breakage of an image to be recorded is further suppressed.

The mixing ratio between the colored pigment and the pigment dispersant is preferably in a range of 1:0.06 to 1:3, more preferably in a range of 1:0.125 to 1:2, and still more preferably in a range of 1:0.125 to 1:1.5 in terms of the mass.

As a dispersion apparatus for dispersing the pigment, a known dispersion apparatus can be used, and examples thereof include a ball mill, a sand mill, a beads mill, a roll mill, a jet mill, a paint shaker, an attritor, an ultrasonic disperser, and a disper.

(Water)

In the present disclosure, the colored ink contains water. The content of water is not particularly limited and is, for example, in a range of 40% by mass to 70% by mass.

(Resin Particles)

In the present disclosure, from the viewpoint of obtaining the rub resistance of the image, it is preferable that the colored ink contains at least one kind of resin particles. It is preferable that the colored ink contains resin particles which are particles formed of a resin, in addition to the pigment dispersant.

In a case where the colored ink is applied onto the base material onto which the pretreatment liquid has been applied, the aggregating agent contained in the pretreatment liquid comes into contact with the resin particles contained in the colored ink and destabilizes the dispersion of the resin particles, and thus the viscosity of the colored ink is increased. In this manner, the colored ink is fixed on the base material, and the image quality of an image to be recorded is improved.

It is preferable that the resin constituting the resin particles is a water-insoluble polymer. The term "water-insoluble" in the water-insoluble polymer denotes a property that the amount of the polymer to be dissolved in 100 g of distilled water at 25° C. is less than 2 g.

The resin particles include preferably at least one of particles consisting of an acrylic resin (hereinafter, referred to as "acrylic resin particles") or particles consisting of a urethane resin (hereinafter, also referred to as "urethane resin particles"), and preferably acrylic resin particles.

It is preferable that the resin particles are self-dispersing resin particles.

Examples of the self-dispersing resin particles include resin particles described in paragraphs 0062 to 0076 of JP2016-188345A and paragraphs 0109 to 0140 of WO2013/180074A.

It is preferable that the resin in the resin particles is an acrylic resin having a structural unit derived from a (meth) acrylate having an aromatic ring structure or an alicyclic structure, a structural unit derived from (meth)acrylic acid, and a structural unit derived from alkyl (meth)acrylate containing an alkyl group having 1 to 4 carbon atoms.

As the (meth)acrylate having an alicyclic structure, alkyl (meth)acrylate containing a cycloalkyl group having 3 to 10 carbon atoms is preferable, at least one selected from the group consisting of cyclohexyl (meth)acrylate, isobornyl (meth)acrylate, adamantyl (meth)acrylate, and dicyclopentanyl (meth)acrylate is preferable, and at least one selected from the group consisting of isobornyl (meth)acrylate, adamantyl (meth)acrylate, and dicyclopentanyl (meth)acrylate is more preferable.

It is preferable that the (meth)acrylate having an aromatic ring structure is phenoxyethyl (meth)acrylate or benzyl (meth)acrylate.

Examples of the resin in the resin particles include a phenoxyethyl acrylate/methyl methacrylate/acrylic acid copolymer (50/45/5), a phenoxyethyl acrylate/benzyl methacrylate/isobutyl methacrylate/methacrylic acid copolymer (30/35/29/6), a phenoxyethyl methacrylate/isobutyl methacrylate/methacrylic acid copolymer (50/44/6), a phenoxyethyl acrylate/methyl methacrylate/ethyl acrylate/acrylic acid copolymer (30/55/10/5), a benzyl methacrylate/isobutyl methacrylate/methacrylic acid copolymer (35/59/6), a styrene/phenoxyethyl acrylate/methyl methacrylate/acrylic acid copolymer (10/50/35/5), a benzyl acrylate/methyl methacrylate/acrylic acid copolymer (55/40/5), a phenoxyethyl methacrylate/benzyl acrylate/methacrylic acid copolymer (45/47/8), a styrene/phenoxyethyl acrylate/butyl methacrylate/acrylic acid copolymer (5/48/40/7), a benzyl methacrylate/isobutyl methacrylate/cyclohexyl methacrylate/methacrylic acid copolymer (35/30/30/5), a phenoxyethyl acrylate/methyl methacrylate/butyl acrylate/methacrylic acid copolymer (12/50/30/8), a benzyl acrylate/isobutyl methacrylate/acrylic acid copolymer (93/2/5), a methyl methacrylate/methoxyethyl acrylate/benzyl methacrylate/acrylic acid copolymer (44/15/35/6), a styrene/butyl acrylate/acrylic acid copolymer (62/35/3), a methyl methacrylate/phenoxyethyl acrylate/acrylic acid copolymer (45/51/4), a methyl methacrylate/isobornyl methacrylate/methacrylic acid copolymer (20/72/8), a methyl methacrylate/isobornyl methacrylate/methacrylic acid copolymer (40/52/8), a methyl methacrylate/isobornyl methacrylate/methacrylic acid copolymer (48/42/10), a methyl methacrylate/isobornyl methacrylate/dicyclopentanyl methacrylate/methacrylic acid copolymer (20/62/10/8), a methyl methacrylate/dicyclopentanyl methacrylate/methacrylic acid copolymer (20/72/8), and a methyl methacrylate/isobornyl methacrylate/methacrylic acid/sodium methacrylate (70/20/5/5). In addition, the values in parentheses represent the mass ratios of the structural units derived from monomers.

The acid value of the resin in the resin particles is preferably 25 mgKOH/g to 100 mgKOH/g, more preferably 30 mgKOH/g to 90 mgKOH/g, and still more preferably 35 mgKOH/g to 80 mgKOH/g.

The weight-average molecular weight of the resin in the resin particles is preferably in a range of 1,000 to 300,000, more preferably in a range of 2,000 to 200,000, and still more preferably in a range of 5,000 to 100,000.

From the viewpoint of the jetting stability, the average particle diameter of the resin particles is preferably in a range of 1 nm to 200 nm, more preferably in a range of 3 nm to 200 nm, and still more preferably in a range of 5 nm to 50 nm. Further, the average particle diameter of the resin particles is acquired by measuring the volume average particle diameter using a particle size distribution measuring device, for example, "NANOTRAC UPA-EX150" (product name, manufactured by Nikkiso Co., Ltd.) according to a dynamic light scattering method.

In a case where the colored ink contains resin particles, the content of the resin particles is preferably in a range of 0.1% by mass to 15% by mass, more preferably in a range of 0.5% by mass to 10% by mass, still more preferably in a range of 1% by mass to 8% by mass, and even still more preferably in a range of 2% by mass to 5% by mass with respect to the total mass of the colored ink.

(Organic Solvent)

From the viewpoint of improving jetting stability, it is preferable that the colored ink contains at least one kind of organic solvent.

Examples of the organic solvent include alkanediol (polyhydric alcohol) such as glycerin, 1,2,6-hexanetriol, trimethylolpropane, ethylene glycol, diethylene glycol, triethylene glycol, propylene glycol, dipropylene glycol, tripropylene glycol, 1,3-butanediol, or 2,3-butanediol; alkyl alcohol having 1 to 4 carbon atoms such as ethanol, methanol, butanol, propanol, or isopropanol; and glycol ether such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, triethylene glycol monoethyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol, dipropylene glycol monomethyl ether, dipropylene glycol monoethyl ether, dipropylene glycol mono-n-propyl ether, dipropylene glycol mono-iso-propyl ether, or tripropylene glycol monomethyl ether.

The content of the organic solvent is preferably in a range of 5% by mass to 60% by mass, preferably in a range of 10% by mass to 40% by mass, and still more preferably in a range of 15% by mass to 30% by mass with respect to the total amount of the colored ink.

(Surfactant)

From the viewpoint of improving jetting stability, the colored ink may contain at least one surfactant.

Examples of the surfactant include surfactants described in JP1987-173463A (JP-S62-173463A) and JP1987-183457A (JP-S62-183457A). In addition, examples of the surfactant include anionic surfactants such as dialkyl sulfosuccinate, alkyl naphthalene sulfonate, and a fatty acid salt; nonionic surfactants such as polyoxyethylene alkyl ether, polyoxyethylene alkyl allyl ether, acetylene glycol, and a polyoxyethylene-polyoxypropylene block copolymer; and cationic surfactants such as an alkylamine salt and a quaternary ammonium salt. Further, the surfactant may be a fluorine-based surfactant or a silicone-based surfactant.

In the present disclosure, from the viewpoint of further suppressing breakage of an image to be recorded, it is preferable that the surfactant includes a nonionic surfactant. Among these, it is preferable that the nonionic surfactant is an acetylene glycol derivative (acetylene glycol-based surfactant).

Examples of the acetylene glycol-based surfactant include an alkylene oxide adduct of 2,4,7,9-tetramethyl-5-decyne-4,7-diol and 2,4,7,9-tetramethyl-5-decyne-4,7-diol. Examples of commercially available products thereof include E Series such as OLFINE E1010 and E1020 (manufactured by Nissin Chemical Co., Ltd.).

It is also preferable that the surfactant includes a fluorine-based surfactant. Examples of commercially available products thereof include Capstone FS-63 and Capstone FS-61 (manufactured by DuPont), FTERGENT 100, FTERGENT 110, and FTERGENT 150 (manufactured by Neos Co., Ltd.), and CHEMGUARD S-760P (manufactured by Chemguard Inc.).

The content of the surfactant is preferably in a range of 0.01% by mass to 4.0% by mass, more preferably in a range of 0.5% by mass to 3.0% by mass, and still more preferably in a range of 1.2% by mass to 2.0% by mass with respect to the total amount of the colored ink.

It is preferable that the surfactant includes an acetylene glycol surfactant and a fluorine-based surfactant. The content of the acetylene glycol surfactant is preferably in a range of 0.01% by mass to 3.0% by mass, more preferably in a range of 0.1% by mass to 2.0% by mass, and still more preferably in a range of 0.8% by mass to 1.5% by mass with respect to the total amount of the colored ink. The content of the fluorine-based surfactant is preferably in a range of 0.01% by mass to 1.0% by mass, more preferably in a range of 0.05% by mass to 0.7% by mass, and still more preferably in a range of 0.1% by mass to 0.3% by mass with respect to the total amount of the colored ink.

(Additive)

The colored ink may contain additives such as a co-sensitizer, an ultraviolet absorbing agent, an antioxidant, a fading inhibitor, a conductive salt, and a basic compound, as necessary.

(Physical Properties)

From the viewpoint of improving the jetting stability, the pH of the colored ink is preferably in a range of 7 to 10 and more preferably in a range of 7.5 to 9.5. The pH is measured at 25° C. using a pH meter, for example, a pH meter (model number "HM-31", manufactured by DKK-Toa Corporation).

The viscosity of the colored ink is preferably in a range of 0.5 mPa·s to 30 mPa·s, more preferably in a range of 2 mPa·s to 20 mPa·s, still more preferably in a range of 2 mPa·s to 15 mPa s, and even still more preferably in a range of 3 mPa·s to 10 mPa·s. The viscosity is measured at 25° C. using a viscometer, for example, a TV-22 type viscometer (manufactured by Toki Sangyo Co., Ltd.).

The surface tension of the colored ink is preferably 60 mN/m or less, more preferably in a range of 20 mN/m to 50 mN/m, and still more preferably in a range of 30 mN/m to 45 mN/m. The surface tension is measured at 25° C. by a plate method using a surface tension meter, for example, an automatic surface tension meter (product name, "CBVP-Z", manufactured by Kyowa Interface Science Co., Ltd.).

<White Ink>

In the present disclosure, the white ink contains a white pigment, a pigment dispersant, and water.

(White Pigment)

The white pigment may be a pigment exhibiting a white color, and the kind thereof is not particularly limited. Examples of the white pigment include titanium oxide, strontium titanate, barium titanate, zinc oxide, magnesium oxide, zirconium oxide, aluminum oxide, barium sulfate, silica, talc, mica, aluminum hydroxide, calcium silicate, aluminum silicate, and zinc sulfide. The white pigment is preferably particles having titanium atoms and more preferably titanium oxide.

The average particle diameter of the white pigment is preferably in a range of 10 nm to 550 nm, more preferably in a range of 100 nm to 450 nm, and still more preferably in a range of 150 nm to 400 nm. The color reproducibility is enhanced in a case where the average particle diameter is 550 nm or less, and the jetting stability is enhanced in a case where an image is recorded by an ink jet recording method. Further, the light resistance is enhanced in a case where the average particle diameter is 10 nm or greater. In addition, the particle size distribution of the pigment may be any of a wide particle size distribution or a monodispersed particle size distribution. Further, the average particle diameter and the particle size distribution of the pigment are acquired by measuring the volume average particle diameter using a particle size distribution measuring device, for example, "NANOTRAC UPA-EX150" (product name, manufactured by Nikkiso Co., Ltd.) according to a dynamic light scattering method. In a case where the pigment is coated with the pigment dispersant, the average particle diameter of the pigment denotes the average particle diameter of the pigment coated with the pigment dispersant.

From the viewpoints of the image density and the jetting stability, the content of the white pigment is preferably in a range of 5% by mass to 20% by mass and more preferably in a range of 8% by mass to 15% by mass with respect to the total amount of the colored ink.

(Pigment Dispersant)

The white ink of the present disclosure contains a pigment dispersant.

The acid value of the pigment dispersant contained in the white ink is preferably in a range of 30 mgKOH/g to 170 mgKOH/g, more preferably in a range of 60 mgKOH/g to 150 mgKOH/g, and still more preferably in a range of 80 mgKOH/g to 120 mgKOH/g. In a case where the acid value of the pigment dispersant is 30 mgKOH/g or greater, the image quality of an image to be recorded is more excellent. Further, in a case where the acid value of the pigment dispersant is 170 mgKOH/g or less, breakage of an image to be recorded is further suppressed.

The pigment dispersant contains a polymer having a crosslinked structure or a block polymer. The preferable aspects of the polymer having a crosslinked structure and the block polymer contained in the white ink are the same as the preferable aspects of the polymer having a crosslinked structure and the block polymer contained in the colored ink.

However, in a case where the pigment dispersant of the white ink according to the present disclosure is a block polymer, the acid value of the block polymer is preferably in a range of 30 mgKOH/g to 170 mgKOH/g, more preferably in a range of 60 mgKOH/g to 150 mgKOH/g, and still more preferably in a range of 80 mgKOH/g to 120 mgKOH/g. In a case where the acid value of the block polymer is 30 mgKOH/g or greater, the image quality of the image to be recorded is more excellent. Further, in a case where the acid value of the block polymer is 170 mgKOH/g or less, breakage of the image to be recorded is further suppressed.

In a case where the pigment dispersant of the white ink according to the present disclosure is a crosslinked polymer, the acid value of the crosslinked polymer is preferably in a range of 45 mgKOH/g to 160 mgKOH/g, more preferably in a range of 70 mgKOH/g to 135 mgKOH/g, and still more preferably in a range of 95 mgKOH/g to 105 mgKOH/g. In a case where the acid value of the crosslinked polymer is 45 mgKOH/g or greater, the image quality of the image to be recorded is more excellent. Further, in a case where the acid value of the crosslinked polymer is 160 mgKOH/g or less, breakage of an image to be recorded is further suppressed.

In the present disclosure, it is preferable that the pigment dispersant contained in the white ink is a block polymer. It is considered that the pigment dispersant is unlikely to be desorbed from the surface of the white pigment in a case where the pigment dispersant is a block polymer. As a result, it is considered that in a case where the white ink is applied onto the base material onto which the pretreatment liquid has been applied, aggregation by the aggregating agent contained in the pretreatment liquid is more uniformly carried out, and thus breakage of an image to be recorded is further suppressed.

The mixing ratio between the white pigment and the pigment dispersant is preferably in a range of 1:0.06 to 1:3, more preferably in a range of 1:0.125 to 1:2, and still more preferably in a range of 1:0.125 to 1:1.5 in terms of the mass.
(Water)

In the present disclosure, the white ink contains water. The content of water is not particularly limited and is, for example, in a range of 40% by mass to 70% by mass.
(Resin Particles)

In the present disclosure, from the viewpoint of obtaining the rub resistance of the image, it is preferable that the white ink contains at least one kind of resin particles. It is preferable that the white ink contains resin particles which are particles formed of a resin, in addition to the pigment dispersant.

In a case where the white ink is applied onto the base material onto which the pretreatment liquid has been applied, the aggregating agent contained in the pretreatment liquid comes into contact with the resin particles contained in the white ink and destabilizes the dispersion of the resin particles, and thus the viscosity of the white ink is increased. In this manner, the white ink is fixed on the base material, and the image quality of an image to be recorded is improved.

The preferable aspects of the resin particles contained in the white ink are the same as the preferable aspects of the resin particles contained in the colored ink.

In a case where the white ink contains resin particles, the content of the resin particles is preferably in a range of 0.1% by mass to 15% by mass, more preferably in a range of 0.5% by mass to 10% by mass, still more preferably in a range of 1% by mass to 8% by mass, and even still more preferably in a range of 2% by mass to 6% by mass with respect to the total amount of the white ink.
(Organic Solvent)

From the viewpoint of improving jetting stability, it is preferable that the white ink contains at least one organic solvent.

The preferable aspects of the organic solvent contained in the white ink are the same as the preferable aspects of the organic solvent contained in the colored ink.

The content of the organic solvent is preferably in a range of 5% by mass to 60% by mass, preferably in a range of 10% by mass to 40% by mass, and still more preferably in a range of 20% by mass to 35% by mass with respect to the total amount of the white ink.
(Surfactant)

From the viewpoint of improving jetting stability, it is preferable that the white ink may contain at least one surfactant.

The preferable aspects of the surfactant contained in the white ink are the same as the preferable aspects of the surfactant contained in the colored ink.

The content of the surfactant is preferably in a range of 0.01% by mass to 4.0% by mass, more preferably in a range of 0.1% by mass to 3.0% by mass, and still more preferably in a range of 1.0% by mass to 1.8% by mass with respect to the total amount of the white ink. The content of the acetylene glycol surfactant is preferably in a range of 0.01% by mass to 3.0% by mass, more preferably in a range of 0.1% by mass to 2.0% by mass, and still more preferably in a range of 0.8% by mass to 1.5% by mass with respect to the total amount of the white ink. The content of the fluorine-based surfactant is preferably in a range of 0.01% by mass to 1.0% by mass, more preferably in a range of 0.05% by mass to 0.7% by mass, and still more preferably in a range of 0.1% by mass to 0.3% by mass with respect to the total amount of the white ink.
(Additive)

The white ink may contain additives such as a co-sensitizer, an ultraviolet absorbing agent, an antioxidant, a fading inhibitor, a conductive salt, and a basic compound, as necessary.
(Physical Properties)

From the viewpoint of improving the jetting stability, the pH of the white ink is preferably in a range of 7 to 10 and more preferably in a range of 7.5 to 9.5. The pH is measured at 25° C. using a pH meter, for example, a pH meter (model number "HM-31", manufactured by DKK-Toa Corporation).

The viscosity of the white ink is preferably in a range of 0.5 mPa·s to 30 mPa·s, more preferably in a range of 2 mPa·s to 20 mPa·s, still more preferably in a range of 2 mPa·s to 15 mPa s, and even still more preferably in a range of 3 mPa·s to 10 mPa·s. The viscosity is measured at 25° C. using a viscometer, for example, a TV-22 type viscometer (manufactured by Toki Sangyo Co., Ltd.).

The surface tension of the white ink is preferably 60 mN/m or less, more preferably in a range of 20 mN/m to 50 mN/m, and still more preferably in a range of 30 mN/m to 45 mN/m. The surface tension is measured at 25° C. by a plate method using a surface tension meter, for example, an automatic surface tension meter (product name, "CBVP-Z", manufactured by Kyowa Interface Science Co., Ltd.).

The absolute value of a difference between the surface tension of the colored ink and the surface tension of the white ink is preferably in a range of 0.01 mN/m to 15.0 mN/m, more preferably in a range of 0.05 mN/m to 10.0 mN/m, and still more preferably in a range of 3.5 mN/m to 7.0 mN/m. In a case where the absolute value of the difference is 0.01 mN/m or greater, breakage of an image to be recorded is further suppressed. In addition, in a case where the absolute value of the difference is 15.0 mN/m or less, the image quality of an image to be recorded is more excellent.

The ink set of the present disclosure may further contain a pretreatment liquid containing an aggregating agent in addition to the colored ink and the white ink.

(Aggregating Agent)

The aggregating agent contains preferably at least one selected from the group consisting of a polyvalent metal compound, an organic acid, a metal complex, and a cationic polymer and more preferably an organic acid.

—Polyvalent Metal Compound—

Examples of the polyvalent metal compound include salts of alkaline earth metals of a group 2 (such as magnesium and calcium) in the periodic table, transition metals of a group 3 (such as lanthanum) in the periodic table, metals of a group 13 (such as aluminum) in the periodic table, and lanthanides (such as neodymium).

As salts of these metals, salts of organic acids, a nitrate, a chloride, and a thiocyanate described below are preferable.

Among these, preferred examples of the polyvalent metal compound include a calcium salt or magnesium salt of an organic acid (such as formic acid, acetic acid, or a benzoic acid), a calcium salt or magnesium salt of nitric acid, calcium chloride, magnesium chloride, and a calcium salt or magnesium salt of thiocyanic acid.

Further, it is preferable that at least a part of the polyvalent metal compound is dissociated into polyvalent metal ions and counterions in the pretreatment liquid.

—Organic Acid—

As the organic acid, an organic compound containing an acidic group is exemplified.

Examples of the acidic group include a phosphoric acid group, a phosphonic acid group, a phosphinic acid group, a sulfuric acid group, a sulfonic acid group, a sulfinic acid group, and a carboxy group.

Among these, from the viewpoint of the aggregation rate of the ink, a phosphoric acid group or a carboxy group is preferable, and a carboxy group is more preferable as the acidic group.

Further, it is preferable that at least a part of the acidic group is dissociated in the pretreatment liquid.

Examples of the organic compound containing a carboxy group include (meth)acrylic acid, poly(meth)acrylic acid, acetic acid, formic acid, benzoic acid, glycolic acid, malonic acid, malic acid (preferably DL-malic acid), maleic acid, succinic acid, glutaric acid, pimelic acid, adipic acid, fumaric acid, citric acid, tartaric acid, phthalic acid, 4-methylphthalic acid, lactic acid, pyrrolidone carboxylic acid, pyrrone carboxylic acid, pyrrole carboxylic acid, furan carboxylic acid, pyridine carboxylic acid, coumaric acid, thiophene carboxylic acid, and nicotinic acid.

Among these, from the viewpoint of the aggregation rate of the ink, as the organic compound containing a carboxy group, di- or higher valent carboxylic acid (hereinafter, also referred to as polyvalent carboxylic acid) is preferable, and dicarboxylic acid is more preferable.

Specifically, as the polyvalent carboxylic acid, malonic acid, malic acid, maleic acid, succinic acid, glutaric acid, pimelic acid, adipic acid, fumaric acid, tartaric acid, 4-methylphthalic acid, or citric acid is preferable, and malonic acid, malic acid, tartaric acid, succinic acid, glutaric acid, pimelic acid, adipic acid, or citric acid is more preferable.

It is preferable that the organic acid has a low pKa (for example, 1.0 to 5.0). In this manner, the surface charge of particles such as resin particles or the pigment stably dispersed in the ink by a weakly acidic functional group such as a carboxy group can be reduced by bringing the ink into contact with an organic acid having a lower pKa to degrade the dispersion stability.

It is preferable that the organic acid has a low pKa, high solubility in water, and a valence of divalent or higher. Further, it is more preferable that the organic acid has a high buffer capacity in a pH region with a pKa lower than the pKa of a functional group (for example, a carboxy group) that stably disperses particles in the ink.

—Metal Complex—

It is preferable that the metal complex contains at least one selected from the group consisting of zirconium, aluminum, and titanium as a metal element.

As the metal complex, a metal complex including at least one selected from the group consisting of acetate, acetylacetonate, methylacetoacetate, ethylacetoacetate, octylene glycolate, butoxyacetylacetonate, lactate, a lactate ammonium salt, and triethanol aminate as a ligand is preferable.

The metal complex may be a commercially available product. Further, various organic ligands, particularly various multidentate ligands that are capable of forming metal chelate catalysts are commercially available. Accordingly, the metal complex may be a metal complex prepared by combining a commercially available organic ligand with a metal.

Examples of the metal complex include zirconium tetraacetyl acetonate (for example, "ORGATIX ZC-150", manufactured by Matsumoto Fine Chemical Co., Ltd.), zirconium monoacetyl acetonate (for example, "ORGATIX ZC-540", manufactured by Matsumoto Fine Chemical Co., Ltd.), zirconium bisacetyl acetonate (for example, "ORGATIX ZC-550", manufactured by Matsumoto Fine Chemical Co., Ltd.), zirconium monoethyl acetoacetate (for example, "ORGATIX ZC-560", manufactured by Matsumoto Fine Chemical Co., Ltd.), zirconium acetate (for example, "ORGATIX ZC-115", manufactured by Matsumoto Fine Chemical Co., Ltd.), titanium diisopropoxy bis(acetylacetonate) (for example, "ORGATIX TC-100", manufactured by Matsumoto Fine Chemical Co., Ltd.), titanium tetraacetyl acetonate (for example, "ORGATIX TC-401", manufactured by Matsumoto Fine Chemical Co., Ltd.), titanium dioctyloxy bis(octylene glycolate) (for example, "ORGATIX TC-200", manufactured by Matsumoto Fine Chemical Co., Ltd.), titanium diisopropoxy bis(ethylacetoacetate) (for example, "ORGATIX TC-750", manufactured by Matsumoto Fine Chemical Co., Ltd.), zirconium tetraacetyl acetonate (for example, "ORGATIX ZC-700", manufactured by Matsumoto Fine Chemical Co., Ltd.), zirconium tributoxy monoacetyl acetonate (for example, "ORGATIX ZC-540", manufactured by Matsumoto Fine Chemical Co., Ltd.), zirconium monobutoxy acetyl acetonate bis(ethylacetoacetate) (for example, "ORGATIX ZC-570", manufactured by Matsumoto Fine Chemical Co., Ltd.), zirconium dibutoxy bis(ethylacetoacetate) (for example, "ORGATIX ZC-580", manufactured by Matsumoto Fine Chemical Co., Ltd.), aluminum trisacetyl acetonate (for example, "ORGATIX AL-80", manufactured by Matsumoto Fine Chemical Co., Ltd.), titanium lactate ammonium salt (for example, "ORGATIX TC-300", manufactured by Matsumoto Fine Chemical Co., Ltd.), titanium lactate (for example, "ORGATIX TC-310, 315", manufactured by Matsumoto Fine Chemical Co., Ltd.), titanium triethanol aminate (for example, "ORGATIX TC-400", manufactured by Matsumoto Fine Chemical Co., Ltd.), and a zirconyl chloride compound (for example, "ORGATIX ZC-126", manufactured by Matsumoto Fine Chemical Co., Ltd.).

Among these, titanium lactate ammonium salt (for example, "ORGATIX TC-300", manufactured by Matsumoto Fine Chemical Co., Ltd.), titanium lactate (for example, "ORGATIX TC-310, 315", manufactured by Matsumoto Fine Chemical Co., Ltd.), titanium triethanol aminate (for example, "ORGATIX TC-400", manufactured by Matsumoto Fine Chemical Co., Ltd.), and a zirconyl chloride compound (for example, "ORGATIX ZC-126", manufactured by Matsumoto Fine Chemical Co., Ltd.) are preferable as the metal complex.

—Cationic Polymer—

In addition, the pretreatment liquid may be in a form containing one or two or more kinds of cationic polymers as an aggregating component. It is preferable that the cationic polymer is a homopolymer of a cationic monomer containing a primary to tertiary amino group or a quaternary ammonium base, or a copolymer or a condensed polymer of a cationic monomer and a non-cationic monomer. The cationic polymer may be used in any form of a water-soluble polymer or water-dispersible latex particles.

Examples of the cationic polymer include a polyvinylpyridine salt, polyalkylaminoethyl acrylate, polyalkylaminoethyl methacrylate, polyvinylimidazole, polyethyleneimine, polybiguanide, polyguanide, polyallylamine, and derivatives thereof.

From the viewpoint of the viscosity of the pretreatment liquid, it is preferable that the weight-average molecular weight of the cationic polymer decreases. In a case where the pretreatment liquid is applied to a recording medium by an ink jet recording method, the weight-average molecular weight thereof is preferably in a range of 1,000 to 500,000, more preferably in a range of 1,500 to 200,000, and still more preferably in a range of 2,000 to 100,000. It is advantageous that the weight-average molecular weight thereof is 1000 or greater from the viewpoint of aggregation rate. It is advantageous that the weight-average molecular weight thereof is 500,000 or less from the viewpoint of jetting reliability. However, in a case where the pretreatment liquid is applied to a recording medium by a method other than the ink jet recording method, the weight-average molecular weight thereof is not limited thereto.

The pretreatment liquid of the present disclosure may contain only one or two or more kinds of aggregating agents.

The content of the aggregating agent is preferably in a range of 0.1% by mass to 40% by mass, more preferably in a range of 0.1% by mass to 30% by mass, still more preferably in a range of 1% by mass to 20% by mass, and particularly preferably in a range of 1% by mass to 10% by mass with respect to the total amount of the pretreatment liquid.

(Other Components)

The pretreatment liquid may contain other components as necessary in addition to the aggregating agent. Examples of other components that may be contained in the pretreatment liquid include known additives such as an organic solvent, resin particles, a surfactant, a solid wetting agent, colloidal silica, an inorganic salt, a fading inhibitor, an emulsification stabilizer, a penetration enhancer, an ultraviolet absorbing agent, a preservative, a fungicide, a pH adjuster, a viscosity adjuster, a rust inhibitor, a chelating agent, and a water-soluble polymer compound (for example, water-soluble polymer compounds described in paragraphs 0026 to 0080 of JP2013-001854A).

(Physical Properties)

The pH of the pretreatment liquid is preferably 0.1 to 4.5, more preferably 0.2 to 4.0, from the viewpoint of the aggregation rate of the ink. The pH is measured at 25° C. using a pH meter, for example, a pH meter (model number "HM-31", manufactured by DKK-Toa Corporation).

From the viewpoint of the aggregation rate of the ink, the viscosity of the pretreatment liquid is preferably in a range of 0.5 mPa·s to 10 mPa·s and more preferably in a range of 1 mPa·s to 5 mPa·s. The viscosity is a value measured at 25° C. using a viscometer. The viscosity is measured at 25° C. using a viscometer, for example, a TV-22 type viscometer (manufactured by Toki Sangyo Co., Ltd.).

The surface tension of the pretreatment liquid is preferably 60 mN/m or less, more preferably in a range of 20 mN/m to 50 mN/m, and still more preferably in a range of 30 mN/m to 45 mN/m. The surface tension is a value measured at a temperature of 25° C. The surface tension is measured at 25° C. by a plate method using a surface tension meter, for example, an automatic surface tension meter (product name, "CBVP-Z", manufactured by Kyowa Interface Science Co., Ltd.).

The absolute value of the difference between the surface tension of the pretreatment liquid and the surface tension of the colored ink is preferably in a range of 0.05 mN/m to 10.0 mN/m. The absolute value of the difference between the surface tension of the pretreatment liquid and the surface tension of the white ink is preferably in a range of 0.05 mN/m to 10.0 mN/m. In a case where the absolute value of the difference is 0.05 mN/m or greater, breakage of an image to be recorded is further suppressed. In addition, in a case where the absolute value of the difference is 10.0 mN/m or less, the image quality of an image to be recorded is more excellent.

[Image Recording Method]

The image recording method of the present disclosure includes a pretreatment liquid applying step of applying the pretreatment liquid onto an impermeable base material, and an ink applying step of applying the colored ink and the white ink onto the impermeable base material onto which the pretreatment liquid has been applied, using an ink jet recording method.

(Pretreatment Liquid Adding Step)

The application of the pretreatment liquid in the pretreatment liquid applying step can be performed by employing a known application method such as a coating method, an ink jet recording method, or a dipping method.

Examples of the coating method include known coating methods using a bar coater, an extrusion die coater, an air doctor coater, a blade coater, a rod coater, a knife coater, a squeeze coater, and a reverse roll coater.

The details of the ink jet recording method are the same as the details of the ink jet recording method in the ink applying step described below.

The application amount of the pretreatment liquid is preferably in a range of 0.5 g/m² to 2.5 g/m² and more preferably in a range of 1.0 g/m² to 2.0 g/m².

Further, the impermeable base material may be heated before the application of the pretreatment liquid. The heating temperature may be appropriately set according to the kind of the impermeable base material and the composition of the pretreatment liquid, but the temperature of the impermeable base material is set to be preferably in a range of 30° C. to 70° C. and more preferably in a range of 30° C. to 60° C.

The impermeable base material may be an impermeable base material that has been subjected to a surface treatment in advance. Further, an impermeable base material may be subjected to a surface treatment before the application of the pretreatment liquid in the pretreatment applying step, using an impermeable base material which has not been subjected to a surface treatment. Examples of the surface treatment include a corona treatment, a plasma treatment, a flame treatment, a heat treatment, an abrasion treatment, a light irradiation treatment (such as a UV treatment), and a flame treatment, but the surface treatment is not limited thereto. The corona treatment can be performed using, for example, Corona Master (product name, "PS-10S", manufactured by Shinko Electric & Instrumentation Co., Ltd.). The conditions for the corona treatment may be appropriately selected according to the kind of the impermeable base material and the like.

In the pretreatment liquid applying step, the pretreatment liquid applied onto the impermeable base material may be heated and dried. Examples of the means for heating and drying the pretreatment liquid include known heating means such as a heater, known air blowing means such as a dryer, and means for combining these.

Examples of the method of heating and drying the pretreatment liquid include a method of applying heat using a heater or the like from a side of the impermeable base material opposite to the surface onto which the pretreatment liquid has been applied; a method of applying warm air or hot air to the surface of the impermeable base material onto which the pretreatment liquid has been applied; a method of applying heat using an infrared heater from the surface of the impermeable base material onto which the pretreatment liquid has been applied or from a side of the impermeable base material opposite to the surface onto which the pretreatment liquid has been applied; and a method of combining a plurality of these methods.

The heating temperature of heating and drying the pretreatment liquid is preferably 35° C. or higher and more preferably 40° C. or higher. The upper limit of the heating temperature is not particularly limited, but is preferably 100° C., more preferably 90° C., and still more preferably 70° C.

The time of heating and drying the pretreatment liquid is not particularly limited, but is preferably in a range of 0.5 seconds to 60 seconds, more preferably in a range of 0.5 seconds to 20 seconds, and still more preferably in a range of 0.5 seconds to 10 seconds.

(Ink Application Step)

The ink applying step is a step of applying the colored ink and the white ink onto the impermeable base material onto which the pretreatment liquid has been applied, using an ink jet recording method. The white ink may be applied onto the impermeable base material onto which the pretreatment liquid has been applied, after the colored ink has been applied, or the colored ink may be applied thereto after the white ink has been applied. In a case where the impermeable base material is transparent and is used for reverse printing, it is preferable that the white ink is applied onto the impermeable base material onto which the pretreatment liquid has been applied, after the colored ink has been applied thereto. In a case where the white ink is applied after the colored ink is applied, it is preferable to apply the white ink onto the colored ink film formed by the application of the colored ink.

A difference between the surface tension of the ink applied in advance and the surface tension of the pretreatment liquid onto the impermeable base material onto which the pretreatment liquid has been applied is preferably in a range of 0.05 mN/m to 10 mN/m. For example, in a case where the colored ink and the white ink are applied in the order of the colored ink and the white ink onto the impermeable base material onto which the pretreatment liquid has been applied, the difference between the surface tension of the colored ink and the surface tension of the pretreatment liquid is preferably in a range of 0.05 mN/m to 10 mN/m. Further, in a case where the white ink and the colored ink are applied in this order, the difference between the surface tension of the white ink and the surface tension of the pretreatment liquid is preferably in a range of 0.05 mN/m to 10 mN/m.

The method of jetting the ink in the ink jet recording method is not particularly limited, and any of known methods such as an electric charge control method of jetting an ink using an electrostatic attraction force, a drop-on-demand method (pressure pulse method) using a vibration pressure of a piezoelectric element, an acoustic ink jet recording method of jetting an ink using a radiation pressure by converting an electric signal into an acoustic beam and irradiating the ink with the acoustic beam, and a thermal ink jet (bubble jet (registered trademark)) method of heating an ink to form air bubbles and using the generated pressure may be used.

As the ink jet recording method, particularly, an ink jet recording method, described in JP1979-59936A (JP-S54-59936A), of jetting an ink from a nozzle using an action force caused by a rapid change in volume of the ink after being subjected to an action of thermal energy can be effectively used. Further, as the ink jet recording method, the method described in paragraphs 0093 to 0105 of JP2003-306623A can also be employed.

The application of the ink onto the impermeable base material onto which the pretreatment liquid has been applied using the ink jet recording method can be performed by allowing the ink to be jetted from a nozzle of an ink jet head.

Examples of the system of the ink jet head include a shuttle system of performing recording while scanning a short serial head in the width direction of a recorded medium and a line system of using a line head in which recording elements are aligned in correspondence with the entire area of one side of a recorded medium.

In the line system, image recording can be performed on the entire surface of the recorded medium by scanning the recorded medium in a direction intersecting the direction in which the recording elements are aligned. In the line system, a transport system such as a carriage that scans a short head in the shuttle system is not necessary. Further, in the line system, since movement of a carriage and complicated scanning control between the short head and the recorded medium are not necessary as compared with the shuttle system, only the recorded medium moves. Therefore, according to the line system, image recording at a higher speed than that of the shuttle system can be realized.

It is preferable that the application of the ink is performed using an ink jet head having a resolution of 300 dpi or greater (more preferably 600 dpi or greater and still more preferably 800 dpi or greater). Here, dpi stands for dot per inch, and 1 inch is 2.54 cm.

From the viewpoint of obtaining a high-definition image, the liquid droplet amount of the ink to be jetted from the nozzle of the ink jet head is preferably in a range of 1 pico liter (pL) to 10 pL and more preferably in a range of 1.5 pL to 6 pL. Further, from the viewpoints of improving the image unevenness and improving connection of continuous gradations, it is also effective that the ink is jetted by combining different liquid droplet amounts.

The total application amount of the colored ink and the white ink onto the impermeable base material onto which the pretreatment liquid has been applied is preferably in a range of 3.0 g/m² to 35.0 g/m², more preferably in a range of 9.0 g/m² to 25.0 g/m², and still more preferably in a range of 12.0 g/m² to 20.0 g/m². In a case where the total application amount thereof is 3.0 g/m² or greater, the image quality of an image to be recorded is more excellent. Further, in a case where the total application amount is 35.0 g/m² or less, breakage of an image to be recorded is further suppressed, and the image quality of an image to be recorded is more excellent.

In the ink applying step, the ratio of the total application amount of the colored pigment and the white pigment to the application amount of the aggregating agent is preferably in a range of 5 to 400, more preferably in a range of 20 to 300, and still more preferably in a range of 50 to 150 in terms of the mass. In a case where the ratio thereof is 5 or greater, breakage of an image to be recorded is further suppressed. Further, in a case where the ratio thereof is 400 or less, the image quality of an image to be recorded is more excellent.

Here, the application amount of the aggregating agent and the total application amount of the colored pigment and the white pigment each denote an applied mass (g/m²) per area of 1 m².

The application amount of the aggregating agent can be acquired based on the application amount (g/m²) of the pretreatment liquid and the content (% by mass) of the aggregating agent contained in the pretreatment liquid, and can be adjusted by adjusting at least one of the application amount of the pretreatment liquid or the content of the aggregating agent.

The application amount of the colored pigment can be acquired based on the application amount (g/m²) of the colored pigment and the content (% by mass) of the colored pigment contained in the colored ink, and can be adjusted by adjusting at least one of the application amount of the colored pigment or the content of the colored pigment.

The application amount of the white pigment can be acquired based on the application amount (g/m²) of the white ink and the content (% by mass) of the colored pigment contained in the white ink, and can be adjusted by adjusting at least one of the application amount of the white ink or the content of the colored pigment.

(Other Steps)

The image recording method of the present disclosure may include a drying step of heating and drying the applied ink after the ink applying step.

Examples of the means for heating and drying the ink include known heating means such as a heater, known air blowing means such as a dryer, and means for combining these.

Examples of the method of heating and drying the ink include a method of applying heat using a heater or the like from a side of the impermeable base material opposite to the surface onto which the ink has been applied; a method of applying warm air or hot air to the surface of the impermeable base material onto which the ink has been applied; a method of applying heat using an infrared heater from the surface of the impermeable base material onto which the ink has been applied or from a side of the impermeable base material opposite to the surface onto which the ink has been applied; and a method of combining a plurality of these methods.

The heating temperature of heating and drying the ink is preferably 55° C. or higher, more preferably 60° C. or higher, and particularly preferably 65° C. or higher. The upper limit of the heating temperature is not particularly limited, but is, for example, 100° C. and preferably 90° C.

The time of heating and drying the ink is not particularly limited, but is preferably in a range of 3 seconds to 60 seconds, more preferably in a range of 5 seconds to 60 seconds, and particularly preferably in a range of 10 seconds to 45 seconds.

In addition, the image recording method of the present disclosure may be a method including a colored ink applying step of applying the colored ink onto the impermeable base material and a white ink applying step of applying the white ink onto the colored ink film formed by the application of the colored ink.

Since the details of the colored ink applying step and the white ink applying step are the same as the details of the above-described ink applying step, the description thereof will not be provided.

The image recording method of the present disclosure may include a drying step of heating and drying the applied ink after the white ink applying step. Since the details of the drying step are the same as the details of the drying step, the description thereof will not be provided.

EXAMPLES

Hereinafter, the present disclosure will be described in more detail based on examples, but the present disclosure is not limited to the following examples unless the gist thereof is overstepped. In the examples, the surface tension was measured by a plate method using an automatic surface tension meter (product name, "CBVP-Z", manufactured by Kyowa Interface Science Co., Ltd.). The acid value was measured by the method described in JIS K 0070: 1992.

Examples 1 to 30 and Comparative Examples 1 and 2

First, a magenta pigment dispersion liquid and a white pigment dispersion liquid were respectively prepared, and various additives were added to the prepared magenta pigment dispersion liquid and the prepared white pigment dispersion liquid, thereby preparing a magenta ink and a white ink.

Pigment dispersants P1 to P4 and pigment dispersants Q1 to Q8 used in the preparation of the magenta pigment dispersion liquid and the white pigment dispersion liquid were prepared by the following methods.

(Pigment Dispersant P1)

965 g of dipropylene glycol was added to a 5000 mL three-neck flask provided with a stirrer and a cooling pipe and heated to 85° C. in a nitrogen atmosphere. A solution I obtained by dissolving 640 g of benzyl methacrylate, 340 g of methacrylic acid, and 19.94 g of 2-mercaptopropionic acid in 370.28 g of dipropylene glycol, and a solution II obtained by dissolving 17.69 g of t-butyl peroxy-2-ethylhexanoate (PERBUTYL 0, manufactured by NOF Corporation) in 221.17 g of dipropylene glycol were respectively prepared. The solution I was added dropwise to the three-neck flask for 4 hours, and the solution II was added dropwise thereto for 5 hours. After completion of the dropwise addition, the solution was allowed to further react for 2 hours. The disappearance of the monomers was confirmed by 1H-NMR. The obtained reaction solution was heated to 70° C., 248.02 g of a 50 mass % potassium hydroxide aqueous solution was added thereto, 107.48 g of dipropylene glycol and 75.52 g of pure water were added thereto, and the solution was stirred, thereby obtaining a 37 mass % solution of a random polymer. This random polymer was defined as a pigment dispersant P1. The structural units constituting the obtained random polymer were confirmed by 1H-NMR. In addition, the weight-average molecular weight (Mw) was acquired by GPC. The weight-average molecular weight (Mw) of the obtained pigment dispersant P1 was 8400, and the acid value thereof was 221.7 mgKOH/g.

(Pigment Dispersant P2)

A pigment dispersant P2 was obtained by the same manner as the method for the pigment dispersant P1 except that the charge amounts of benzyl methacrylate, methyl methacrylate, and methacrylic acid contained in the solution I were changed. Specifically, the pigment dispersant was prepared by dissolving 456 g of benzyl methacrylate, 329 g of methyl methacrylate, 215 g of methacrylic acid, and 19.94 g of 2-mercaptopropionic acid in 370.28 g of dipropylene glycol. The obtained pigment dispersant P2 was a random polymer, the weight-average molecular weight (Mw) thereof was 9000, and the acid value thereof was 145.3 mgKOH/g.

(Pigment Dispersant P3)

A pigment dispersant P3 was obtained by the same manner as the method for the pigment dispersant P1 except that the charge amounts of benzyl methacrylate, methyl methacrylate, and methacrylic acid contained in the solution I were changed. Specifically, the pigment dispersant was prepared by dissolving 838.9 g of benzyl methacrylate, 161.1 g of methacrylic acid, and 19.94 g of 2-mercaptopropionic acid in 370.28 g of dipropylene glycol. The obtained pigment dispersant P3 was a random polymer, the weight-average molecular weight (Mw) thereof was 9200, and the acid value thereof was 100.5 mgKOH/g.

(Pigment Dispersant P4)

198.2 parts by mass of diethylene glycol monobutyl ether (hereinafter, abbreviated as "BC"), 1.0 parts by mass of iodine, 3.7 parts by mass of 2,2'-azobis(4-methoxy-2,4-dimethylvaleronitrile) (hereinafter, also abbreviated as "V-70"), 107.8 parts by mass of tricyclodecyl methacrylate (trade name, "FA-513M", manufactured by Hitachi Chemical Co., Ltd., homopolymer Tg=173° C., hereinafter, abbreviated as "TCDMA"), 19.5 parts by mass of methacrylic acid (hereinafter, abbreviated as "MAA"), and 0.17 parts by mass of diphenylmethane as a catalyst were added to a 500 ml separable flask equipped with a reflux tube, a gas introduction device, a thermometer, and a stirrer. The mixture was polymerized at 45° C. for 5 hours while nitrogen was allowed to flow, thereby obtaining a solution of a random polymer. The polymerization rate (yield) of the random polymer calculated from the solid content of the solution was 96.2%. Further, the Mn measured by GPC was 9,800. The solid content of the obtained solution of the random polymer was 41.4%. After the solution of the random polymer was cooled, 66.1 parts by mass of BC was added to the solution to adjust the solid content to 33.3% by mass. This random polymer was defined as a pigment dispersant P4. The acid value of the pigment dispersant P4 was 100 mgKOH/g.

(Pigment Dispersant Q1)

198.2 parts by mass of BC, 1.0 parts by mass of iodine, 3.7 parts by mass of V-70, 66.1 parts of TCDMA, and 0.17 parts by mass of diphenylmethane were added to a 500 ml separable flask equipped with a reflux tube, a gas introduction device, a thermometer, and a stirrer. The mixture was polymerized at 45° C. for 5 hours while nitrogen was allowed to flow, thereby obtaining a solution of an A polymer block. The polymerization rate (yield) of the A polymer block calculated from the solid content of the solution was 96.2%. The number average molecular weight (Mn) measured by GPC was 4900, the molecular weight distribution (hereinafter, abbreviated as "PDI") was 1.20, and the peak top molecular weight was 6000. Next, the temperature of the polymerization was decreased to 40° C., and 41.7 parts by mass of TCDMA, 19.5 parts by mass of MAA, and 1.2 parts by mass of V-70 were added to the obtained solution of the A polymer block. Further, a B polymer block was formed by carrying out the polymerization for 4 hours, increasing the temperature to 70° C., and carrying out the polymerization for 1 hour, thereby obtaining a solution of an A-B block copolymer.

The solid content of the obtained solution of the A-B block copolymer was 41.2%, and the polymerization rate of the B polymer block calculated from the solid content was approximately 100%. After the solution of the A-B block copolymer was cooled, 66.1 parts by mass of BC was added thereto to adjust the solid content to 33.3% by mass. This A-B block copolymer was defined as a pigment dispersant Q1. The Mn of the pigment dispersant Q1 was 9,500, and the acid value was 100.0 mgKOH/g. The acid value is a value calculated by performing titration with phenolphthalein an indicator using a 0.1 mol/L potassium hydroxide solution containing ethanol and toluene as solvents.

(Pigment Dispersant Q2)

A pigment dispersant Q2 was obtained by the same method as that for the pigment dispersant Q1 except that the charge amounts of TCDMA and MAA into the solution of the A polymer block were changed. Specifically, 47.2 parts by mass of TCDMA, 14.1 parts by mass of MAA, and 1.2 parts by mass of V-70 were added to the solution of the A polymer block. The pigment dispersant Q2 was a block polymer, the Mn thereof was 10,500, and the acid value thereof 72 mgKOH/g.

(Pigment Dispersant Q3)

A pigment dispersant Q3 was obtained by the same method as that for the pigment dispersant Q1 except that the charge amounts of TCDMA and MAA into the solution of the A polymer block were changed. Specifically, 54.4 parts by mass of TCDMA, 6.8 parts by mass of MAA, and 1.2 parts by mass of V-70 were added to the solution of the A polymer block. The pigment dispersant Q3 was a block polymer, the Mn thereof was 10,500, and the acid value thereof was 35 mgKOH/g.

(Pigment Dispersant Q4)

A pigment dispersant Q4 was obtained by the same method as that for the pigment dispersant Q1 except that the charge amounts of TCDMA and MAA into the solution of the A polymer block were changed. Specifically, 38.6 parts by mass of TCDMA, 22.7 parts by mass of MAA, and 1.2 parts by mass of V-70 were added to the solution of the A polymer block. The pigment dispersant Q4 was a block polymer, the Mn thereof was 10,500, and the acid value thereof was 116 mgKOH/g.

(Pigment Dispersant Q5)

A pigment dispersant Q5 was obtained by the same method as that for the pigment dispersant Q1 except that the charge amounts of TCDMA and MAA into the solution of the A polymer block were changed. Specifically, 34.3 parts by mass of TCDMA, 27.0 parts by mass of MAA, and 1.2 parts by mass of V-70 were added to the solution of the A polymer block. The pigment dispersant Q5 was a block polymer, the Mn thereof was 10,500, and the acid value thereof was 138 mgKOH/g.

(Pigment Dispersant Q6)

A pigment dispersant Q6 was obtained by the same method as that for the pigment dispersant Q1 except that the charge amounts of TCDMA and MAA into the solution of the A polymer block were changed. Specifically, 29.0 parts by mass of TCDMA, 32.2 parts by mass of MAA, and 1.2 parts by mass of V-70 were added to the solution of the A polymer block. The pigment dispersant Q6 was a block polymer, the Mn thereof was 11,500, and the acid value thereof was 165 mgKOH/g.

(Pigment Dispersant Q7)

A pigment dispersant Q7 was obtained by the same method as that for the pigment dispersant Q1 except that the charge amount of TCDMA in the formation of the A polymer block and the charge amounts of TCDMA and MAA into the solution of the A polymer block were changed. Specifically, the charge amount of TCDMA in the formation of the A polymer block was set to 27.2 parts by mass. In addition, 65.2 parts by mass of TCDMA, 13.5 parts by mass of MAA, and 1.2 parts by mass of V-70 were added to the solution of the A polymer block. The pigment dispersant Q7 was a block polymer, the Mn thereof was 9300, and the acid value thereof was 88 mgKOH/g.

(Pigment Dispersant Q8)

A pigment dispersant Q8 which was a block polymer was synthesized with reference to Synthesis Example 8 of JP2015-83688A. Details are described below.

266 parts by mass of diethylene glycol dimethyl ether, 6.2 parts by mass of 2-iodo-2-cyanopropane, 120 parts by mass of methyl methacrylate (MMA), 28.8 parts by mass of acrylic acid (AA), 67.2 parts by mass of cyclohexyl methacrylate (CHMA), 7.9 parts by mass of azobisdimethylisovaleronitrile (hereinafter, abbreviated as "V-65"), and 0.7 parts by mass of 2-t-butyl-4,6-dimethylphenol were added to a reactor of a 1 L separable flask equipped with a stirrer, a backflow condenser, a thermometer, and a nitrogen introduction pipe, and the mixture was stirred while nitrogen was allowed to flow. Next, the temperature (reaction temperature) of the mixture in the reactor was increased to 70° C., and the mixture was polymerized for 3 hours, thereby obtaining a polymerization solution A containing an MMA/AA/CHMA copolymer. After 3 hours, as a result of sampling a part of the polymerization solution A and measuring the solid content, the solid content was 42.0% by mass, and thus it was confirmed that most of the monomers were polymerized. Further, the weight-average molecular weight of the MMA/AA/CHMA copolymer was measured by GPC, and the weight-average molecular weight (Mw) thereof was 7,500. The acid value of this MMA/AA/CHMA copolymer was 101.0 mgKOH/g.

Next, a mixture of benzyl methacrylate (BzMA) (35.2 parts by mass) and V-65 (0.3 parts by mass) was added to the polymerization solution A, and the mixture was polymerized at 70° C. for 3 hours, thereby obtaining a polymerization solution B containing a block polymer. Here, the obtained block polymer is a block polymer containing an A block which is an MMA/AA/CHMA copolymer and a B block which is a BzMA homopolymer. The obtained block polymer was defined as a pigment dispersant Q8. As a result of measurement of the solid content in the polymerization solution B, the solid content thereof was 43.2% by mass and it was confirmed that most of the monomers were polymerized. The Mw of the pigment dispersant Q8 was 8,500, and the acid value was 89.3 mgKOH/g.

(Magenta Ink M1)

—Preparation of Magenta Pigment Dispersion Liquid MA1—

150 parts by mass of the pigment dispersant P1 was dissolved in water, and a polymer aqueous solution was prepared such that the concentration of the pigment dispersant P1 was set to approximately 25% by mass. 180 parts by mass of the polymer aqueous solution, 90 parts by mass of PR-122 (FUJI Fast Red (registered trademark), manufactured by Fuji Pigment Co., Ltd.), which is a magenta pigment, and 171.9 parts by mass of water were mixed with each other, thereby obtaining a mixed solution. A potassium hydroxide aqueous solution was added to the obtained mixed solution, and the pH after neutralization was adjusted to 8.7. Further, the pH is a value measured at 25° C. using a pH meter (model name: WM-50EG, manufactured by DKK-Toa Corporation). Next, the mixed solution after neutralization was subjected to a dispersion treatment for 3 hours using a bead mill (bead diameter: 0.1 mmφ, zirconia beads). In this manner, a magenta pigment dispersion liquid (uncrosslinked dispersion liquid) in which the magenta pigment was dispersed by the pigment dispersant P1 was obtained. The concentration of the pigment in the uncrosslinked dispersion liquid was 15% by mass.

Next, 3.00 parts by mass of trimethylolpropane polyglycidyl ether (product name, "Denacol EX-321", manufactured by Nagase ChemteX Corporation) as a crosslinking agent and 32.8 parts by mass of a boric acid aqueous solution (concentration of boric acid: 4% by mass) were added to 136 parts by mass of the uncrosslinked dispersion liquid, and the mixture was allowed to react at 70° C. for 6 hours and cooled to 25° C. In this manner, the pigment dispersant P1 was crosslinked to obtain a magenta pigment dispersion liquid (crosslinked dispersion liquid) in which the magenta pigment was dispersed by the pigment dispersant P1a. The pigment dispersant P1a is a polymer in which the pigment dispersant P1 is crosslinked with a crosslinking agent. Ion exchange water was added to the crosslinked dispersion liquid so that the concentration of the pigment was set to 15% by mass. Ultrafiltration was performed by allowing 600 mL of the crosslinked dispersion liquid to flow into an ultrafiltration device (cross-flow type ultrafilter (UF), manufactured by Sartorius) provided with a polyether sulfone (PESU) film (size of micropores: 0.1 μm) for 1 minute. At this time, the liquid temperature was adjusted to 25° C., and the ultrafiltration was performed 10 times by setting 1 time of the volume magnification of the charged liquid as 1 time. Ion exchange water was added such that the concentration of the pigment was set to 15% by mass. In this manner, a magenta pigment dispersion liquid MA1 was obtained. The acid value of the pigment dispersant P1a (crosslinked polymer) contained in the magenta pigment dispersion liquid MA1 was 105 mgKOH/g.

—Preparation of Magenta Ink M1—

A magenta ink M1 was prepared by mixing the following components.

Magenta pigment dispersion liquid MA1 (concentration of pigment: 15% by mass): 46.7% by mass Dispersion liquid of resin particles A (concentration of solid contents: 23% by mass): 12.9% by mass Propylene glycol: 26.0 parts by mass OLFINE E1010 (manufactured by Nissin Chemical Co., Ltd.): 0.25% by mass OLFINE E1020 (manufactured by Nissin Chemical Co., Ltd.): 1.0% by mass Capstone FS 63 (concentration of solid contents: 35% by mass, manufactured by Dupont): 0.7% by mass Water: remaining amount such that total amount of composition of ink reached 100% by mass The resin particles A were prepared by the following method.

A 2 L three-neck flask (reaction container) provided with a stirrer, a thermometer, a reflux condenser, and a nitrogen gas introduction pipe was charged with 560.0 g of methyl ethyl ketone, and the solution was heated to 87° C. Next, a mixed solution consisting of 220.4 g of methyl methacrylate, 301.6 g of isobornyl methacrylate, 58.0 g of methacrylic acid, 108 g of methyl ethyl ketone, and 2.32 g of dimethyl 2,2'-azobis(2-methyl propionate) (product name, "V-601", manufactured by FUJIFILM Wako Pure Chemical Corporation) as a polymerization initiator was added dropwise to the methyl ethyl ketone in the reaction container at a constant speed such that the dropwise addition was completed for 2 hours while the reflux state in the reaction container was maintained. Further, the reflux state was maintained until the reaction was completed. After completion of the dropwise addition, the mixed solution was stirred for 1 hour and subjected to an operation of the following step (1).

Step (1): A solution consisting of 1.16 g of "V-601" and 6.4 g of methyl ethyl ketone was added to the solution, and the resulting solution was stirred for 2 hours.

Next, the operation of the step (1) was repeatedly performed four times, a solution formed of 1.16 g of "V-601" and 6.4 g of methyl ethyl ketone was added to the solution, and the resulting solution was stirred for 3 hours.

After completion of the reaction, the temperature of the solution was lowered to 65° C., 163.0 g of isopropanol was added thereto, and the solution was allowed to be naturally cooled, thereby obtaining a polymerization solution containing a copolymer (concentration of solid contents of 41.0% by mass).

Next, 317.3 g of the obtained polymerization solution was weighed, 46.4 g of isopropanol, 1.65 g of a 20 mass % maleic acid anhydride aqueous solution (corresponding to 0.3% by mass as maleic acid with respect to the copolymer), and 40.77 g of a 2 mol/L sodium hydroxide aqueous solution were added to the solution, and the temperature of the liquid in the reaction container was increased to 70° C.

Next, 380 g of distilled water was added dropwise to the liquid, which had been heated to 70° C., at a speed of 10 mL/min. Thereafter, a total amount of 287.0 g of isopropanol, methyl ethyl ketone, and distilled water was distilled off by maintaining the temperature of the liquid in the reaction container at 70° C. for 1.5 hours under reduced pressure. 0.278 g (440 ppm as benzisothiazolin-3-one with respect to solid content of polymer) of PROXEL GXL (S) (manufactured by Arch Chemicals, Inc.) was added to the obtained liquid.

The obtained liquid was filtered through a filter with a pore size of 1 μm, and the filtrate was collected, thereby obtaining an aqueous dispersion liquid (concentration of solid contents: 23.2% by mass) of the resin particles A formed of a copolymer of methyl methacrylate, isobornyl methacrylate, methacrylic acid, and sodium methacrylate at a mass ratio of 70/20/5/5. The volume average particle diameter of the resin particles A was 5.0 nm, and the weight-average molecular weight (Mw) thereof was 60,000.

(Magenta Inks M2 to M8)

—Preparation of Magenta Pigment Dispersion Liquid MA2—

150 parts by mass of the pigment dispersant Q1 was dissolved in water to prepare an aqueous polymer solution such that the concentration of the pigment dispersant Q1 was approximately 25% by mass. 180 parts by mass of the polymer aqueous solution, 90 parts by mass of PR-122 (FUJI Fast Red (registered trademark), manufactured by Fuji Pigment Co., Ltd.), which is a magenta pigment, and 171.9 parts by mass of water were mixed with each other, thereby obtaining a mixed solution. A potassium hydroxide aqueous solution was added to the obtained mixed solution, and the pH after neutralization was adjusted to 8.7. Next, the mixed solution after neutralization was subjected to a dispersion treatment for 3 hours using a bead mill (bead diameter: 0.1 mmφ, zirconia beads). In this manner, a magenta pigment dispersion liquid in which the magenta pigment was dispersed by the pigment dispersant Q1 was obtained. The concentration of the pigment was 15% by mass.

—Preparation of magenta pigment dispersion liquid MA3—

A magenta pigment dispersion liquid MA3 was obtained by the same method as that for the magenta pigment dispersion liquid MA1 except that the charge amount of the crosslinking agent was changed to 4.28 parts by mass and the charge amount of the boric acid aqueous solution was changed to 47.1 parts by mass. The acid value of the pigment dispersant P1b (crosslinked polymer) contained in the magenta pigment dispersion liquid MA3 was 54 mgKOH/g.

—Preparation of Magenta Pigment Dispersion Liquid MA4—

A magenta pigment dispersion liquid MA4 was obtained by the same method as that for the magenta pigment dispersion liquid MA1 except that the charge amount of the crosslinking agent was changed to 5.03 parts by mass and the charge amount of the boric acid aqueous solution was changed to 55.5 parts by mass. The acid value of the pigment dispersant P1c (crosslinked polymer) contained in the magenta pigment dispersion liquid MA4 was 24 mgKOH/g.

—Preparation of Magenta Pigment Dispersion Liquid MA5—

A magenta pigment dispersion liquid MA5 was obtained by the same method as that for the magenta pigment dispersion liquid MA1 except that the charge amount of the crosslinking agent was changed to 2.21 parts by mass and the charge amount of the boric acid aqueous solution was changed to 24.3 parts by mass. The acid value of P1d (crosslinked polymer) contained in the magenta pigment dispersion liquid MA5 was 135 mgKOH/g.

—Preparation of magenta pigment dispersion liquid MA6—

A magenta pigment dispersion liquid MA6 was obtained by the same method as that for the magenta pigment dispersion liquid MA1 except that the charge amount of the crosslinking agent was changed to 1.57 parts by mass and the charge amount of the boric acid aqueous solution was changed to 17.3 parts by mass. The acid value of P1e (crosslinked polymer) contained in the magenta pigment dispersion liquid MA6 was 160 mgKOH/g.

—Preparation of Magenta Pigment Dispersion Liquid MA7—

A magenta pigment dispersion liquid MA7 was obtained by the same method as that for the magenta pigment dispersion liquid MA1 except that the charge amount of the crosslinking agent was changed to 0.55 parts by mass and the charge amount of the boric acid aqueous solution was changed to 6.08 parts by mass. The acid value of P1f (crosslinked polymer) contained in the magenta pigment dispersion liquid MA7 was 200 mgKOH/g.

—Preparation of Magenta Pigment Dispersion Liquid MA8—

A magenta pigment dispersion liquid MA8 was obtained by the same method as that for the magenta pigment dispersion liquid MA1 except that the pigment dispersant P1 was changed to the pigment dispersant P2, the charge amount of the crosslinking agent was changed to 2.07 parts by mass, and the charge amount of the boric acid aqueous solution was changed to 22.84 parts by mass. The acid value of the pigment dispersant P2a (crosslinked polymer) contained in the magenta pigment dispersion liquid MA8 was 84.2 mgKOH/g.

—Preparation of Magenta Inks M2 to M8—

Magenta inks M2 to M8 were prepared by the same method as that for the magenta ink M1 except that the magenta pigment dispersion liquids MA2 to MA8 were used.

(Magenta Inks M9 and M10)

The magenta inks M9 and M10 were prepared by the same method as that for the magenta ink M1 except that the content (% by mass) of the organic solvent and the content of the surfactant were changed as listed in Table 2.

(Magenta Ink M11)

—Preparation of Magenta Pigment Dispersion Liquid MA11—

A magenta pigment dispersion liquid (uncrosslinked dispersion liquid) in which the magenta pigment was dispersed by the pigment dispersant P3 was obtained by changing the pigment dispersant P1 to the pigment dispersant P3. The obtained uncrosslinked dispersion liquid was defined as a magenta pigment dispersion liquid MA11.

—Preparation of Magenta Ink M11—

A magenta ink M11 was prepared by the same method as that for the magenta ink M1 except that the magenta pigment dispersion liquid MA11 was used.

The contents (% by mass) of the pigment, the resin particles, the organic solvent, and the surfactant with respect to the total amount of the magenta ink are listed in Tables 1 and 2. In addition, the kinds and the forms of the pigment dispersants contained in each magenta ink are listed in Tables 1 and 2. In the columns of the forms, "crosslinked" denotes a crosslinked polymer, "block" denotes a block polymer, and "random" denotes a random polymer.

media disperser, thereby obtaining an oil-based pigment dispersion liquid. The average particle diameter of the white pigment dispersed in the oil-based pigment dispersion liquid was 290 nm. The viscosity of the oil-based pigment dispersion liquid was 86.3 mPa·s. Next, a mixed solution consisting of 4.0 parts by mass of potassium hydroxide and 341 parts by mass of water was gradually added to 700 parts by mass of the oil-based pigment dispersion liquid while being stirred using a disper, and the solution was neutralized for phase conversion. Thereafter, the white pigment was sufficiently dispersed using a horizontal media disperser, thereby obtaining an aqueous pigment dispersion liquid. Coarse particles were removed from the obtained aqueous pigment dispersion liquid using a 10 μm filter and a 5 μm filter. At this time, clogging of the filter was not found. The average particle diameter of the white pigment dispersed in the aqueous pigment dispersion liquid was 266 nm. The viscosity of the aqueous pigment dispersion liquid was 14.5 mPa·s, and the pH thereof was 9.8. The average particle diameter of the white pigment was measured by light scattering using a particle size distribution measuring device (product name "UPA-EX150", manufactured by Nikkiso Co., Ltd.).

—Preparation of White Ink W1—

A white ink W1 was prepared by mixing the following components.

White pigment dispersion liquid WA1 (concentration of pigment: 45% by mass): 26.7% by mass Dispersion liquid of resin particles A (concentration of solid contents: 23% by mass): 17.2% by mass Propylene glycol: 27.0 parts by mass

TABLE 1

| | | M1 | M2 | M3 | M4 | M5 | M6 |
|---|---|---|---|---|---|---|---|
| Dispersant | Type | P1a | Q1 | P1b | P1c | P1d | P1e |
| | Form | Crosslinked | Block | Crosslinked | Crosslinked | Crosslinked | Crosslinked |
| | Acid value (mgKOH/g) | 105 | 100 | 54 | 24 | 135 | 160 |
| Pigment | Magenta pigment | 7.0 | 7.0 | 7.0 | 7.0 | 7.0 | 7.0 |
| Resin particles | Resin particles A | 3.0 | 3.0 | 3.0 | 3.0 | 3.0 | 3.0 |
| Organic solvent | Propylene glycol | 26.0 | 26.0 | 26.0 | 26.0 | 26.0 | 26.0 |
| Surfactant | OLFINE E1010 | 0.25 | 0.25 | 0.25 | 0.25 | 0.25 | 0.25 |
| | OLFINE E1020 | 1.0 | 1.0 | 1.0 | 1.0 | 1.0 | 1.0 |
| | Capstone FS-63 | 0.7 | 0.7 | 0.7 | 0.7 | 0.7 | 0.7 |
| Surface tension (mN/m) | | 37 | 37 | 37 | 37 | 37 | 37 |

TABLE 2

| | | M7 | M8 | M9 | M10 | M11 |
|---|---|---|---|---|---|---|
| Dispersant | Type | P1f | P2a | P1a | P1a | P3 |
| | Form | Crosslinked | Crosslinked | Crosslinked | Crosslinked | Random |
| | Acid value (mgKOH/g) | 200 | 84.2 | 112 | 105 | 100.5 |
| Pigment | Magenta pigment | 7.0 | 7.0 | 7.0 | 7.0 | 7.0 |
| Resin particles | Resin particles A | 3.0 | 3.0 | 3.0 | 3.0 | 3.0 |
| Organic solvent | Propylene glycol | 26.0 | 26.0 | 26.0 | 25.0 | 26.0 |
| Surfactant | OLFINE E1010 | 0.25 | 0.25 | 0.25 | 0.2 | 0.25 |
| | OLFINE E1020 | 1.0 | 1.0 | 0.7 | 0.7 | 1.0 |
| | Capstone FS-63 | 0.7 | 0.7 | 0.7 | 0.7 | 0.7 |
| Surface tension (mN/m) | | 37 | 37 | 39.1 | 39.5 | 37 |

(White Ink W1)

—Preparation of White Pigment Dispersion Liquid WA1—

136.4 parts by mass of the pigment dispersant Q1, 163.6 parts by mass of butyl carbitol, and 450 parts of C.I. Pigment White 6 (trade name "JR-405", manufactured by Tayca Corporation, titanium oxide) as a white pigment were blended with each other and stirred with a disper. Next, the white pigment was sufficiently dispersed using a horizontal OLFINE E1010 (manufactured by Nissin Chemical Co., Ltd.): 0.25% by mass OLFINE E1020 (manufactured by Nissin Chemical Co., Ltd.): 1.0% by mass Capstone FS-63 (concentration of solid contents: 35% by mass, manufactured by DuPont): 0.7% by mass Water: remaining amount such that total amount of composition of ink reached 100% by mass (White Ink W2)

—Preparation of White Pigment Dispersion Liquid WA2—

A white pigment dispersion liquid WA2 was obtained by the same method as that for the magenta pigment dispersion liquid MA1 except that C.I. Pigment White 6 (trade name: JP-405, manufactured by Tayca Corporation) serving as a white pigment was used in place of the magenta pigment. The white pigment dispersion liquid WA2 is a dispersion liquid in which a white pigment is dispersed by the pigment dispersant P1a (crosslinked polymer).

—Preparation of White Ink W2—

A white ink W2 was prepared by the same method as that for the white ink W1 except that the white pigment dispersion liquid WA2 was used.

(White Inks W3 to W8, W13, and W14)

—Preparation of White Pigment Dispersion Liquids WA3 to WA8, WA13, and WA14—

White pigment dispersion liquids WA3 to WA8, WA13, and WA14 were obtained by the same method as that for the white pigment dispersion liquid WA1 except that the pigment dispersants Q2 to Q8 and P4 were used in place of the pigment dispersant Q1.

—Preparation of White Inks W3 to W8, W13, and W14—

White inks W3 to W8 and W13 were prepared by the same method as that for the white ink W1 except that the white pigment dispersion liquids WA3 to WA8, WA13, and WA14 were used.

(White Inks W9 to W12)

White inks W9 to W12 were prepared by the same method as that for the white ink W1 except that the content (% by mass) of the organic solvent and the content of the surfactant were changed as listed in Table 4.

The contents (% by mass) of the pigment, the resin particles, the organic solvent, and the surfactant with respect to the total amount of the white ink are listed in Tables 3 and 4. In addition, the kinds and the forms of the pigment dispersants contained in each white ink are listed in Tables 3 and 4. In the columns of the forms, "crosslinked" denotes a crosslinked polymer, "block" denotes a block polymer, and "random" denotes a random polymer.

TABLE 3

|  |  | W1 | W2 | W3 | W4 | W5 | W6 | W7 |
|---|---|---|---|---|---|---|---|---|
| Dispersant | Type | Q1 | P1a | Q2 | Q3 | Q4 | Q5 | Q6 |
|  | Form | Block | Crosslinked | Block | Block | Block | Block | Block |
|  | Acid value (mgKOH/g) | 100 | 105 | 72 | 35 | 116 | 138 | 165 |
| Pigment | White pigment | 12.0 | 12.0 | 12.0 | 12.0 | 12.0 | 12.0 | 12.0 |
| Resin particles | Resin particles A | 4.0 | 4.0 | 4.0 | 4.0 | 4.0 | 4.0 | 4.0 |
| Organic solvent | Propylene glycol | 27.0 | 27.0 | 27.0 | 27.0 | 27.0 | 27.0 | 27.0 |
| Surfactant | OLFINE E1010 | 0.25 | 0.25 | 0.25 | 0.25 | 0.25 | 0.25 | 0.25 |
|  | OLFINE E1020 | 1.0 | 1.0 | 1.0 | 1.0 | 1.0 | 1.0 | 1.0 |
|  | Capstone FS-63 | 0.7 | 0.7 | 0.7 | 0.7 | 0.7 | 0.7 | 0.7 |
| Surface tension (mN/m) |  | 32.8 | 32.8 | 32.8 | 32.8 | 32.8 | 32.8 | 32.8 |

TABLE 4

|  |  | W8 | W9 | W10 | W11 | W12 | W13 | W14 |
|---|---|---|---|---|---|---|---|---|
| Dispersant | Type | Q7 | Q1 | Q1 | Q1 | Q1 | P4 | Q8 |
|  | Form | Block | Block | Block | Block | Block | Random | Block |
|  | Acid value (mgKOH/g) | 88 | 100 | 100 | 100 | 100 | 100 | 89.3 |
| Pigment | White pigment | 12.0 | 12.0 | 12.0 | 12.0 | 12.0 | 12.0 | 12.0 |
| Resin particles | Resin particles A | 4.0 | 4.0 | 4.0 | 4.0 | 4.0 | 4.0 | 4.0 |
| Organic solvent | Propylene glycol | 27.0 | 25.0 | 24.5 | 27.0 | 27.0 | 27.0 | 27.0 |
| Surfactant | OLFINE E1010 | 0.25 | 0.25 | 0.25 | 0.5 | 0.75 | 0.25 | 0.25 |
|  | OLFINE E1020 | 1.0 | 0.8 | 0.7 | 1.0 | 1.5 | 1.0 | 1.0 |
|  | Capstone FS-63 | 0.7 | 0.7 | 0.7 | 1.0 | 1.5 | 0.7 | 0.7 |
| Surface tension (mN/m) |  | 32.8 | 35.48 | 36.98 | 31 | 29 | 32.8 | 32.8 |

(Pretreatment Liquid)

The resin particles, the aggregating agent, the organic solvent, and the surfactant listed in Table 5 and water were mixed such that the contents (% by mass) thereof were set as listed in Table 5, thereby preparing a pretreatment liquid for application to the base material in advance. The pretreatment liquid contained water in addition to the components listed in Table 5 such that the total amount of the pretreatment liquid reached 100% by mass. Details of the resin particles, the aggregating agent, the organic solvent, and the surfactant used for preparing the pretreatment liquid are as follows.

—Resin Particles—

PESRESIN A124GP (polyester resin, manufactured by Takamatsu Oil & Fat Co., Ltd.)

—Aggregating Agent—
Malonic acid
Calcium chloride (CaCl$_2$)
TC-310 (titanium Lactate, manufactured by Matsumoto Fine Chemical Co., Ltd.)
—Organic Solvent—
Propropylene glycol
—Surfactant—
W-13T (sodium dodecyl benzene sulfonate (hard type), manufactured by Tokyo Chemical Industry Co., Ltd.)

TABLE 5

| | | PC-1 | PC-2 | PC-3 | PC-4 | PC-5 | PC-6 | PC-7 |
|---|---|---|---|---|---|---|---|---|
| Resin particles | PESRESIN A124GP | 10 | 10 | 10 | 10 | 10 | 10 | 10 |
| Aggregating agent | Malonic acid | 5 | 5 | 5 | 5 | 5 | — | — |
| | CaCl$_2$ | — | — | — | — | — | 5 | — |
| | TC-310 | — | — | — | — | — | — | 5 |
| Organic solvent | Propylene glycol | 10 | 10 | 8.5 | 12 | 12 | 10 | 10 |
| Surfactant | W-13T | 1 | 0.8 | 0.8 | 1.2 | 1.4 | 1 | 1 |
| Surface tension (mN/m) | | 33 | 35 | 36.97 | 27.8 | 26.6 | 33 | 33 |

[Image Recording]

Image recording was performed by the following method using the ink and the pretreatment liquid. A GELJET (registered trademark) GX5000 printer head (manufactured by Ricoh Co., Ltd.) was prepared as an ink jet head. The ink jet head is a line head in which 96 nozzles are arranged. The ink jet head was disposed by being fixed to an ink jet recording device. The disposition here was made such that the direction in which 96 nozzles were arranged was inclined by 75.7° with respect to a direction orthogonal to a movement direction of a stage of an ink jet recording device on the same plane. A polyethylene terephthalate (PET) base material (FE2001, thickness of 12 µm, manufactured by Futamura Chemical Co., Ltd.) (impermeable base material) was prepared as a base material, and the pretreatment liquid adding step and the image forming step were sequentially performed using the PET base material.

(Pretreatment Liquid Adding Step)

The base material was fixed onto the stage of the ink jet recording device, and the pretreatment liquid was applied onto the base material using a wire bar coater while the stage onto which the base material had been fixed was allowed to move in a linear direction at a constant speed of 500 mm/sec. The application amount of the pretreatment liquid was 1.5 g/m$^2$. The pretreatment liquid was started drying under conditions of 50° C. using a dryer 1.5 seconds after the completion of the application of the pretreatment liquid to a site where the application of the pretreatment liquid had been completed. The drying of the pretreatment liquid was completed 3.5 seconds after the completion of the application of the pretreatment liquid. That is, the drying time was 2 seconds.

(Image Recording Step)

The magenta ink was jetted from the ink jet head onto the surface of the base material to which the pretreatment liquid had been applied while the base material from which the pretreatment liquid had been completely dried was allowed to move at a constant stage speed of 50 mm/sec. The white ink was continuously jetted after the magenta ink had been jetted, to record a solid image, thereby obtaining an image recorded material. A sample piece having a length of 4 cm and a width of 15 cm was cut out from the obtained image recorded material. The magenta ink was started jetting within 2 seconds from the completion of drying of the pretreatment liquid. The ink was jetted under the conditions of a jetting frequency of 24 kHz and a resolution of 1200 dpi×1200 dpi (dot per inch). The total application amount of the magenta ink and the white ink was 17.9 g/m$^2$. Further, the magenta ink and the white ink were degassed through a degassing filter in advance before being jetted, and the temperature was adjusted to 30° C.

[Evaluation]

The breakage and the image quality of the obtained sample pieces (solid images) in the examples and the comparative examples were evaluated. The evaluation method is as follows.

—Image Breakage—

The breakage was evaluated by visually observing the obtained sample pieces. The evaluation standards are as follows.

7: Breakage of an image was not visually recognized.
  6: Breakage of an image was visually recognized at 1 or more and less than 5 sites of the base material in the transport direction.
  5: Breakage of an image was visually recognized at 5 or more and less than 10 sites of the base material in the transport direction.
  4: Breakage of an image was visually recognized at 10 or more and less than 15 sites of the base material in the transport direction.
  3: Breakage of an image was visually recognized at 15 or more and less than 20 sites of the base material in the transport direction.
  2: Breakage of an image was visually recognized at 20 or more sites of the base material in the transport direction.
  1: Breakage of an image was visually recognized without directionality.

—Image Quality—

The obtained sample piece was visually observed, and the image quality was evaluated based on the density unevenness of the solid image. The evaluation standards are as follows.

5: Density unevenness was not found in a case where the solid image was observed at a position spaced by 5 cm.
  4: Density unevenness was found in a case where the solid image was observed at a position spaced by 5 cm, but density unevenness was not found in a case where the solid image was observed at a position spaced by 10 cm.
  3: Density unevenness was found in a case where the solid image was observed at a position spaced by 10 cm, but density unevenness was not found in a case where the solid image was observed at a position spaced by 15 cm.

2: Density unevenness was found in a case where the solid image was observed at a position spaced by 15 cm, but density unevenness was not found in a case where the solid image was observed at a position spaced by 20 cm.

1: Density unevenness was found even in a case where the solid image was observed at a position spaced by 20 cm.

The evaluation results are listed in Tables 6 to 8. In Tables 6 to 8, "|Tm−Tw|" denotes an absolute value of a difference between the surface tension of the magenta ink and the surface tension of the white ink. "|Tm−Tp|" denotes an absolute value of a difference between the surface tension of the magenta ink and the surface tension of the pretreatment liquid.

TABLE 6

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Magenta ink | Type of ink | M1 | M2 | M3 | M4 | M5 | M6 | M7 | M1 | M1 | M1 |
| | Form of dispersant | Cross-linked | Block | Cross-linked | Cross-linked | Cross-linked | Cross-linked | Cross-linked | Cross-linked | Cross-linked | Cross-linked |
| | Acid value | 105 | 100 | 54 | 24 | 135 | 160 | 200 | 105 | 105 | 105 |
| White ink | Type of ink | W1 | W2 | W1 | W1 | W1 | W1 | W1 | W3 | W4 | W5 |
| | Form of dispersant | Block | Cross-linked | Block | Block | Block | Block | Block | Block | Block | Block |
| | Acid value | 100 | 105 | 100 | 100 | 100 | 100 | 100 | 72 | 35 | 118 |
| Type of pretreatment liquid | | PC-1 | PC-1 | PC-1 | PC-1 | PC-1 | PC-1 | PC-1 | PC-1 | PC-1 | PC-1 |
| |Tm − Tw| | | 4.2 | 4.2 | 4.2 | 4.2 | 4.2 | 4.2 | 4.2 | 4.2 | 4.2 | 4.2 |
| |Tm − Tp| | | 4 | 4 | 4 | 4 | 4 | 4 | 4 | 4 | 4 | 4 |
| Evaluated | Image breakage | 7 | 5 | 7 | 7 | 7 | 6 | 4 | 7 | 7 | 7 |
| | Image quality | 5 | 5 | 4 | 2 | 5 | 5 | 5 | 4 | 2 | 5 |

TABLE 7

| | | Example 11 | Example 12 | Example 13 | Example 14 | Example 15 | Example 16 | Example 17 | Example 18 | Example 19 | Example 20 |
|---|---|---|---|---|---|---|---|---|---|---|---|
| Magenta ink | Type of ink | M1 | M1 | M8 | M1 | M8 | M1 | M1 | M9 | M10 | M1 |
| | Form of dispersant | Cross-linked | Cross-linked | Cross-linked | Cross-linked | Cross-linked | Cross-linked | Cross-linked | Cross-linked | Cross-linked | Cross-linked |
| | Acid value | 105 | 105 | 84.2 | 105 | 84.2 | 105 | 105 | 105 | 105 | 105 |
| White ink | Type of ink | W6 | W7 | W1 | W8 | W8 | W9 | W10 | W11 | W12 | W1 |
| | Form of dispersant | Block | Block | Block | Block | Block | Block | Block | Block | Block | Block |
| | Acid value | 138 | 165 | 100 | 88 | 88 | 100 | 100 | 100 | 100 | 100 |
| Type of pretreatment liquid | | PC-1 | PC-1 | PC-1 | PC-1 | PC-1 | PC-1 | PC-1 | PC-1 | PC-1 | PC-2 |
| |Tm − Tw| | | 4.2 | 4.2 | 4.2 | 4.2 | 4.2 | 1.52 | 0.02 | 8.1 | 10.5 | 4.2 |
| |Tm − Tp| | | 4 | 4 | 4 | 4 | 4 | 4 | 4 | 6.1 | 6.5 | 2 |
| Evaluation | Image breakage | 6 | 4 | 6 | 6 | 5 | 6 | 4 | 7 | 7 | 6 |
| | Image quality | 5 | 5 | 5 | 5 | 5 | 5 | 5 | 4 | 2 | 5 |

TABLE 8

| | | Example 21 | Example 22 | Example 23 | Example 24 | Example 25 | Example 26 | Example 27 | Example 28 | Example 29 | Example 30 |
|---|---|---|---|---|---|---|---|---|---|---|---|
| Magenta ink | Type of ink | M1 | M1 | M1 | M1 | M9 | M1 | M1 | M2 | M1 | M1 |
| | Form of dispersant | Cross-linked | Cross-linked | Cross-linked | Cross-linked | Cross-linked | Cross-linked | Cross-linked | Block | Cross-linked | Cross-linked |
| | Acid value | 105 | 105 | 105 | 105 | 105 | 105 | 105 | 100 | 105 | 105 |
| White ink | Type of ink | W1 | W1 | W1 | W10 | W12 | W1 | W1 | W1 | W2 | W14 |
| | Form of dispersant | Block | Block | Block | Block | Block | Block | Block | Block | Cross-linked | Random |
| | Acid value | 100 | 100 | 100 | 100 | 100 | 100 | 100 | 100 | 105 | 89.3 |
| Type of pretreatment liquid | | PC-3 | PC-4 | PC-5 | PC-3 | PC-5 | PC-6 | PC-7 | PC-1 | PC-1 | PC-1 |
| |Tm − Tw| | | 4.2 | 4.2 | 4.2 | 0.02 | 10.1 | 4.2 | 4.2 | 4.2 | 4.2 | 4.2 |
| |Tm − Tp| | | 0.03 | 9.2 | 10.4 | 0.03 | 125 | 4 | 4 | 4 | 4 | 4 |
| Evaluation | Image breakage | 4 | 7 | 7 | 3 | 7 | 7 | 7 | 6 | 6 | 7 |
| | Image quality | 5 | 4 | 2 | 5 | 1 | 5 | 5 | 5 | 5 | 5 |

TABLE 9

|  |  | Comparative Example 1 | Comparative Example 2 |
|---|---|---|---|
| Magenta ink | Type of ink | M1 | M11 |
|  | Form of dispersant | Crosslinked | Random |
|  | Acid value | 105 | 101 |
| White ink | Type of ink | W13 | W13 |
|  | Form of dispersant | Random | Random |
|  | Acid value | 100 | 100 |
| Type of pretreatment liquid |  | PC-1 | PC-1 |
| \|Tm-Tw\| |  | 4.2 | 4.2 |
| \|Tm-Tp\| |  | 4 | 4 |
| Evaluation | Image breakage | 2 | 1 |
|  | Image quality | 5 | 5 |

As listed in Tables 6 to 8, in Examples 1 to 30, it was found that since the pigment dispersants respectively contained in the magenta ink and the white ink contained a polymer having a crosslinked structure or a block polymer, breakage of the recorded image was suppressed.

On the contrary, in Comparative Example 1, since the pigment dispersant contained in the white ink was neither a polymer having a crosslinked structure nor a block polymer, breakage occurred in the recorded image.

In Comparative Example 2, since each of the pigment dispersant contained in the magenta ink and the pigment dispersant contained in the white ink was neither a polymer having a crosslinked structure nor a block polymer, breakage occurred in the recorded image.

It was found that in Example 1, since the pigment dispersant contained in the magenta ink was a polymer having a crosslinked structure, breakage of the recorded image was suppressed as compared with Example 28.

It was found that in Example 1, since the pigment dispersant contained in the white ink was a block polymer, breakage of the recorded image was suppressed as compared with Example 29.

It was found that in Example 1, since the acid value of the pigment dispersant contained in the magenta ink was in a range of 30 mgKOH/g to 180 mgKOH/g, the image quality of the recorded image was excellent as compared with Example 4. Further, it was found that in Example 1, since the acid value of the pigment dispersant contained in the magenta ink was in a range of 30 mgKOH/g to 180 mgKOH/g, breakage of the recorded image was further suppressed as compared with Example 7.

It was found that in Example 1, since the acid value of the pigment dispersant contained in the white ink was in a range of 60 mgKOH/g to 150 mgKOH/g, the image quality of the recorded image was excellent as compared with Example 9. Further, it was found that in Example 1, since the acid value of the pigment dispersant contained in the white ink was in a range of 60 mgKOH/g to 150 mgKOH/g, breakage of the recorded image was further suppressed as compared with Example 12.

It was found that in Example 1, since the absolute value of the difference between the surface tension of the magenta ink and the surface tension of the white ink was in a range of 0.05 mN/m to 10.0 mN/m, the breakage of the recorded image was further suppressed as compared with Example 17. In addition, it was found that the image quality of the recorded image in Example 1 was excellent than that of Example 19.

In Example 1, it was found that since the absolute value of the difference between the surface tension of the magenta ink and the surface tension of the pretreatment liquid was in a range of 0.05 mN/m to 10.0 mN/m, the breakage of the recorded image was further suppressed as compared with Example 21.

It was found that in Example 1, since the absolute value of the difference between the surface tension of the magenta ink and the surface tension of the pretreatment liquid was in a range of 0.05 mN/m to 10.0 mN/m, the image quality of the recorded image was excellent as compared with Example 23.

Examples 31 to 37

Next, images were recorded by the same method as in Example 1 using the magenta ink M1 and the white ink W1 such that the application amount of the pretreatment liquid and the total application amount of the magenta ink and the white ink (in Table 10, "total application amount of ink") were set to the value as listed in Table 10. In addition, the application amount of the magenta ink and the white ink was adjusted such that the ratio (in Table 10, "ratio of total application amount of pigment to application amount aggregating agent") of the total application amount $(g/m^2)$ of the magenta pigment contained in the magenta ink and the white pigment contained in the white ink to the application amount $(g/m^2)$ of the aggregating agent contained in the pretreatment liquid was set to the value as listed in Table 10.

TABLE 10

|  | Example 1 | Example 31 | Example 32 | Example 33 | Example 34 | Example 35 | Example 36 | Example 37 |
|---|---|---|---|---|---|---|---|---|
| Ratio of total application amount of pigment to application amount of aggregating agent | 100 | 350 | 260 | 10 | 100 | 100 | 100 | 100 |
| Application amount of pretreatment liquid $(g/m^2)$ | 1.5 | 1.5 | 1.5 | 1.5 | 0.75 | 2.25 | 1.5 | 1.5 |
| Total application amount of ink $(g/m^2)$ | 17.9 | 17.9 | 17.9 | 17.9 | 17.9 | 17.9 | 5 | 30 |
| Evaluation   Image breakage | 7 | 7 | 7 | 4 | 7 | 4 | 7 | 4 |
|                     Image quality | 5 | 2 | 5 | 5 | 2 | 5 | 2 | 5 |

As listed in Table 10, it was found that in Example 1, since the ratio of the total application amount of the magenta pigment and the white pigment to the amount of the aggregating agent applied was in a range of 20 to 300, the image quality of the recorded image was excellent as compared with Example 31. In addition, it was found that in Example 1, breakage of the recorded image was further suppressed as compared with Example 33.

It was found that in Example 1, since the application amount of the pretreatment liquid was in a range of 1.0 $g/m^2$ to 2.0 $g/m^2$, the image quality of the recorded image was excellent as compared with Example 34. In addition, it was found that in Example 1, breakage of the recorded image was further suppressed as compared with Example 35.

It was found that in Example 1, since the total application amounts of the magenta ink and the white ink was in a range of 9.0 g/m² to 25.0 g/m², the image quality of the recorded image was excellent as compared with Example 36. Further, it was found that in Example 1, the image quality of the recorded image was excellent as compared with Example 37, and breakage of the recorded image was further suppressed.

Example 38

An image was recorded by the same manner as in Example 1 except that the order of jetting the magenta ink and the white ink was reversed in Example 1. That is, in Example 38, the white ink was jetted onto the surface of the base material to which the pretreatment liquid had been applied, and the magenta ink was subsequently jetted after the white ink was jetted to record a solid image, thereby obtaining an image recorded material.

Comparative Example 3

An image was recorded by the same manner as in Comparative Example 1 except that the order of jetting the magenta ink and the white ink was reversed in Comparative Example 1. That is, in Comparative Example 3, the white ink was jetted onto the surface of the base material to which the pretreatment liquid had been applied, and the magenta ink was subsequently jetted after the white ink was jetted to record a solid image, thereby obtaining an image recorded material.

The same evaluations as the evaluations of Example 1 were carried out for Example 38 and Comparative Example 3. As a result, it was found that in Example 38, the image quality of the recorded image was excellent and the breakage of the recorded image was further suppressed as compared with Comparative Example 3.

The present disclosure of JP2020-083140 filed on May 11, 2020 is incorporated herein by reference in its entirety. Further, all documents, patent applications, and technical standards described in the present specification are incorporated herein by reference to the same extent as in a case of being specifically and individually noted that individual documents, patent applications, and technical standards are incorporated by reference.

What is claimed is:

1. An ink set comprising:
a colored ink comprising a colored pigment which is at least one of a chromatic pigment or a black pigment, a pigment dispersant, and water; and
a white ink comprising a white pigment, a pigment dispersant, and water,
wherein the pigment dispersant in the white ink comprises a polymer having a crosslinked structure or a block polymer, and
wherein the pigment dispersant in the colored ink comprises a polymer having structural units derived from an ethylenically unsaturated compound having an aromatic ring structure or an alicyclic structure, and having a crosslinked structure.

2. The ink set according to claim 1,
wherein the pigment dispersant in the white ink comprises the block polymer.

3. The ink set according to claim 1,
wherein an acid value of the pigment dispersant in the colored ink is in a range of 30 mgKOH/g to 180 mgKOH/g.

4. The ink set according to claim 1,
wherein an acid value of the pigment dispersant in the white ink is in a range of 60 mgKOH/g to 150 mgKOH/g.

5. The ink set according to claim 1,
wherein the pigment dispersant in the white ink has a structural unit derived from an ethylenically unsaturated compound having an aromatic ring structure or an alicyclic structure.

6. The ink set according to claim 1,
wherein an absolute value of a difference between a surface tension of the colored ink and a surface tension of the white ink is in a range of 0.05 mN/m to 10.0 mN/m.

7. The ink set according to claim 1, further comprising:
a pretreatment liquid comprising an aggregating agent.

8. The ink set according to claim 7,
wherein an absolute value of a difference between a surface tension of the pretreatment liquid and a surface tension of the colored ink is in a range of 0.05 mN/m to 10.0 mN/m.

9. An image recording method that uses the ink set according to claim 1, the method comprising:
applying the colored ink onto an impermeable base material; and
applying the white ink onto a colored ink film formed by the application of the colored ink.

10. An image recording method that uses the ink set according to claim 7, the method comprising:
applying the pretreatment liquid onto an impermeable base material; and
applying, using an ink jet recording method, the colored ink and the white ink onto the impermeable base material onto which the pretreatment liquid has been applied.

11. An ink set, comprising:
a colored ink comprising a colored pigment which is at least one of a chromatic pigment or a black pigment, a pigment dispersant, and water; and
a white ink comprising a white pigment, a pigment dispersant, and water,
wherein each of the pigment dispersant in the colored ink and the pigment dispersant in the white ink comprises a polymer having a crosslinked structure.

12. The ink set according to claim 11,
wherein an acid value of the pigment dispersant in the colored ink is in a range of 30 mgKOH/g to 180 mgKOH/g.

13. The ink set according to claim 11,
wherein an acid value of the pigment dispersant in the white ink is in a range of 60 mgKOH/g to 150 mgKOH/g.

14. The ink set according to claim 11,
wherein each of the pigment dispersants in the colored ink and the pigment dispersants in the white ink have a structural unit derived from an ethylenically unsaturated compound having an aromatic ring structure or an alicyclic structure.

15. The ink set according to claim 11,
wherein an absolute value of a difference between a surface tension of the colored ink and a surface tension of the white ink is in a range of 0.05 mN/m to 10.0 mN/m.

16. The ink set according to claim 11, further comprising:
a pretreatment liquid comprising an aggregating agent.

17. The ink set according to claim 16,
wherein an absolute value of a difference between a surface tension of the pretreatment liquid and a surface tension of the colored ink is in a range of 0.05 mN/m to 10.0 mN/m.

18. An image recording method that uses the ink set according to claim 11, the method comprising:
applying the colored ink onto an impermeable base material; and
applying the white ink onto a colored ink film formed by the application of the colored ink.

19. An image recording method that uses the ink set according to claim 16, the method comprising:
applying the pretreatment liquid onto an impermeable base material; and
applying, using an ink jet recording method, the colored ink and the white ink onto the impermeable base material onto which the pretreatment liquid has been applied.

* * * * *